United States Patent
Revanur et al.

(10) Patent No.: US 10,890,893 B2
(45) Date of Patent: Jan. 12, 2021

(54) METHOD AND APPARATUS FOR GENERATING GEOMETRIC DATA FOR USE IN ADDITIVE MANUFACTURING

(71) Applicant: RENISHAW PLC, Gloucestershire (GB)

(72) Inventors: Ramkumar Revanur, Pune (IN); Rupesh Badole, Mumbai (IN); Sanjay Dinde, Pune (IN); Mayur Lankeshwar, Pune (IN)

(73) Assignee: RENISHAW PLC, Wotton-under-Edge (GB)

(*) Notice: Subject to any disclaimer, the term of this patent is extended or adjusted under 35 U.S.C. 154(b) by 94 days.

(21) Appl. No.: 16/220,938

(22) Filed: Dec. 14, 2018

(65) Prior Publication Data
US 2019/0121322 A1   Apr. 25, 2019

Related U.S. Application Data

(63) Continuation of application No. 14/901,624, filed as application No. PCT/GB2014/051932 on Jun. 25, 2014, now Pat. No. 10,191,476.

(30) Foreign Application Priority Data

Jun. 26, 2013 (IN) ............................ 2798/CHE/2013
Aug. 12, 2013 (EP) .................................... 13180079
May 2, 2014 (IN) ............................ 1201/DEL/2014

(51) Int. Cl.
*G05B 19/4099* (2006.01)
*B33Y 50/02* (2015.01)

(52) U.S. Cl.
CPC .......... *G05B 19/4099* (2013.01); *B33Y 50/02* (2014.12); *G05B 2219/34247* (2013.01);
(Continued)

(58) Field of Classification Search
CPC ...... G05B 19/4099; G05B 2219/34247; G05B 2219/35134; G05B 2219/49007; G05B 2219/49014; B33Y 50/02
(Continued)

(56) References Cited

U.S. PATENT DOCUMENTS 5,182,715 A  1/1993  Vorgitch et al.
5,595,703 A  1/1997  Swaelens et al.
(Continued)

FOREIGN PATENT DOCUMENTS

CN   101542490 A   9/2009
CN   102896173 A   1/2013
(Continued)

OTHER PUBLICATIONS

Sep. 26, 2014 Search Report issued in International Patent Application No. PCT/GB2014/051932.
(Continued)

*Primary Examiner* — Robert E Fennema
*Assistant Examiner* — Christopher W Carter
(74) *Attorney, Agent, or Firm* — Oliff PLC

(57) ABSTRACT

An apparatus and methods for generating geometric data for use in an additive manufacturing process. The apparatus includes a processing unit. The processing unit may be arranged for receiving data defining surface geometry of a plurality of objects to be built together in an additive manufacturing process, providing a user interface that allows a user to define a location of each object within a common build volume and carrying out a slicing operation on at least one of the objects located in the common build volume independently from another one of objects located in the common build volume. The slicing operation determines sections of the at least one object to be built in the additive manufacturing process. In one embodiment, the objects are
(Continued)

defined in a hierarchical data structure. Supports for supporting the objects during the build may be defined with reference to a 2-dimensional support cross-section.

20 Claims, 13 Drawing Sheets

(52) U.S. Cl.
CPC .............. *G05B 2219/35134* (2013.01); *G05B 2219/49007* (2013.01); *G05B 2219/49014* (2013.01)

(58) Field of Classification Search
USPC .......................................................... 700/98
See application file for complete search history.

(56) References Cited

U.S. PATENT DOCUMENTS

| | | | |
|---|---|---|---|
| 7,084,370 | B2 | 8/2006 | Hagemeister et al. |
| 7,930,054 | B2 | 4/2011 | Slaughter et al. |
| 8,260,589 | B1 | 9/2012 | Kumar |
| 8,452,440 | B2 | 5/2013 | Illston |
| 2004/0153192 | A1 | 8/2004 | Ikeda et al. |
| 2006/0147332 | A1 | 7/2006 | Jones et al. |
| 2007/0233298 | A1 | 10/2007 | Heide et al. |
| 2009/0174709 | A1 | 7/2009 | Kozlak et al. |

FOREIGN PATENT DOCUMENTS

| | | |
|---|---|---|
| CN | 103143706 A | 6/2013 |
| EP | 0655317 A1 | 5/1995 |
| EP | 1120228 A2 | 8/2001 |
| EP | 1683593 A2 | 7/2006 |
| GB | 2489855 A | 10/2012 |
| JP | 2007-172057 A | 7/2007 |
| JP | 2012-096427 A | 5/2012 |
| WO | 2010/007396 A1 | 1/2010 |
| WO | 2014/125258 A2 | 8/2014 |
| WO | 2014/125280 A2 | 8/2014 |

OTHER PUBLICATIONS

Jun. 6, 2014 Search Report and Written Opinion issued in European Patent Application No. 13180079.
Apr. 6, 2017 Office Action issued in Chinese Patent Application No. 201480047367.7.
Dec. 12, 2017 Office Action issued in U.S. Appl. No. 14/901,624.
Peter Lehner, "3D Printing Multiple Objects At Once" (screenshot pdf), Dec. 21, 2012, Screenshots taken from YouTube, link:https://www.youtube.com/watch?v=E6E8nReqgKo.
"3D Printing Multiple Objects At Once Explanation" (summarized explanation of the screenshots taken in pdf "3D Printing Multiple Objects At Once", Dec. 21, 2012, YouTube, link:https://www.youtube.com/watch2v=E6E8nReqgKo.
Mar. 20, 2018 Official Notice of Rejection issued in Japanese Patent Application No. 2016-522862.
Sep. 14, 2018 Notice of Allowance issued in U.S. Appl. No. 14/901,624.

| Master Object | Object Group (Rotation about XY) | Clone Group (Rotation about Z) | Clone Sub-Group (Translation from origin) |

METHOD AND APPARATUS FOR GENERATING GEOMETRIC DATA FOR USE IN ADDITIVE MANUFACTURING

This application is a Continuation of application Ser. No. 14/901,624, filed Dec. 28, 2015, which is a National Stage of PCT/GB2014/051932, filed Jun. 25, 2014, which in turn claims priority to Indian Application No. 1201/DEL/2014, filed May 2, 2014, European Application No. 13180079.9, filed Aug. 12, 2013, and Indian Application No. 2798/CHE/2013, filed Jun. 26, 2013. The entire contents of the prior applications are hereby incorporated by reference herein in their entireties.

SUMMARY OF INVENTION

This invention concerns a method and apparatus for generating geometric data for use in additive manufacturing. The invention has particular application to generating geometric data that defines layers of an object to be built and/or scan path for a laser and/or electron beam to travel when solidifying layers of powder in an additive manufacturing process.

Background

Additive manufacturing or rapid prototyping methods for producing objects comprise layer-by-layer solidification of a material, such as a metal powder material, using a high power energy beam, such as a laser beam. A powder layer is deposited on a powder bed in a build chamber and a laser beam is scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required. In a single build, more than one object can be built, the objects spaced apart in the powder bed.

Usually, an object is not built directly onto a build plate but is supported on the build plate by a series of support structures. For example, the support structures may be a series of cones extending from the build plate to the undersurface of the object. These support structures help to fix the solidified layers to the base, prevent warping of the object during the build and allow the object to be easily separated from the build plate on completion of the build.

To control the apparatus a set of instructions are generated from the geometric data. Such geometric data may define slices of the object corresponding to areas to be melted or sintered in each powder layer and a scan path for the laser to take in melting or sintering the powder layers. Software, such as AutoFab of Marcam Engineering and Magics of Materialise NV, include operations for slicing an object defined in a StereoLithography/Standard Tessellation language (STL) file format to identify layers (slices) of the object to be built in the powder layer and for defining a scan path based upon those slices.

In AutoFab, imported CAD data defining an object is converted into the STL file format. As a first step, the user selects an orientation in which the object is to be built relative to a build platform. Changing the orientation of the object can affect build time, the stresses that the object is subjected to during the build and the number of supports required. Choosing an appropriate orientation can be key to success or failure of the build. Supports are then designed for the selected orientation of the object and combined with the object. The combined object and supports is saved in a .vfx file format. In a single process (from the point of view of the user), the combined object and supports defined in the vfx file is sliced into sections and a scan path is determined for each section, the result saved in a .fab file format. The object and supports as defined by the .fab file can then be positioned within a build volume.

The user can import further objects that are in the .fab format into the build volume. However, it is not possible to import an object that is in one of the other formats (STL, vfx). Accordingly, if one wants to make a change to one of the objects in a build, which requires returning to an earlier file format for that object, either all objects will have to be returned to that earlier stage or the object to be changed will have to be deleted and progressed to the required .fab stage in a separate instance of the application (so in a separate representation of the object in the build volume) and then imported back into the application in which the build comprising multiple objects is being designed. This arrangement does not provide a user friendly, intuitive interface.

Magics also generates supports, slices and a scan path. However, all objects that are to be built together in a single build must first be located on the base plate and then sliced in a single operation.

A problem with the current software is that the slicing operation can take a long time, in some instances hours. Accordingly, a user should ensure that he/she is happy with the orientation of the object(s) and supports before commencing the slicing operation as to change these attributes after the slicing operation would require the object(s) and supports to be re-sliced, introducing significant delays into the build process. However, it is possible to miss regions that require support, even the automatic support generation software of AutoFab and Magics potentially failing to identify regions that require supports. A missing support may only be identified by the user when reviewing the slices. To add one or more missing supports, the user must go back to an earlier stage and re-slice the object, introducing further significant delays.

Furthermore, a user may wish to change the material used to build an object. Changing the material may require parameters, such as hatch distance (the distance between adjacent laser lines of a laser path), spot size and laser power, to be altered. However, to make such alterations, the user must revert to a stage before the slicing operation, requiring the user to re-slice the object and supports for the new parameters.

SUMMARY OF INVENTION

According to a first aspect of the invention there is provided apparatus for generating geometric data for use in an additive manufacturing process, the apparatus comprising a processing unit, the processing unit arranged to receive data, for example as STL files, defining surface geometry of a plurality of objects to be built together in an additive manufacturing process, provide a user interface that allows a user to define a location of each object within a common build volume and carry out a slicing operation on at least one of the objects located in the common build volume independently from another one of objects located in the common build volume, the slicing operation determining sections of the at least one object to be built in the additive manufacturing process.

According to a second aspect of the invention there is provided apparatus for generating geometric data for use in an additive manufacturing process, the apparatus comprising a processing unit, the processing unit arranged to receive data, for example as STL files, defining surface geometry of a plurality of objects to be built together in an additive manufacturing process, provide a user interface that allows a user to define a location of each object within a common build volume, carry out a slicing operation to determine sections of the objects to be built in the additive manufacturing process and, for each section, carry out a scan parameter operation to determine scan parameters for a laser or electron beam to use when solidifying areas of a powder layer to form the section, wherein the processing unit can carry out the scan parameter operation on at least one of the objects located in the common build volume independently from another one of objects located in the common build volume.

In this way, the sections and/or scan parameters of objects located within the common build volume can be determined separately. Accordingly, the user can progress (or possibly, regress) an object/objects through the design process without incurring the delays that would occur if sections and/or scan parameters were determined/re-determined for other objects within the common build volume. Furthermore, after the slicing operation and/or scan parameter operation, the object's location within the common build volume remains defined.

Accordingly, there is no need to import the object after the operation to the common build volume (for example, from a separate instance of the application wherein the object is located in a separate build volume that is not common to all of the plurality of objects). This may result in a more user friendly and intuitive interface, because, for example, changes can be made to an object after the slicing or scan parameter operation that may require the operation(s) to be repeated for that object without incurring the significant delays that would occur if this required the operation(s) to be carried out on all of the plurality of objects having a defined location in the common build volume and it is not necessary to switch between separate instances of the design application.

It will be understood that carrying out an operation on at least one of the objects "independently" from another one of the objects means that the operation can be carried out on at least one object without carrying out the operation on another object. Embodiments of the invention are envisaged wherein objects having common attributes are grouped such that it may not be possible (or desirable) to carry out slicing or scan path operations independently for objects of the group but the processing unit is arranged such that operations on the objects of the group can be carried out independently from objects of another group. For example, for the slicing operation, sections of an object do not change under certain rotations of the object and, therefore, all objects that are different instances of such a rotation may be grouped together, with sections being determined once on a "master object", such sections applying to all objects of that group.

The scan parameter operation may comprise a scan path operation to determine a scan path of the laser or electron beam to take in solidifying areas of the powder layer to form the section. The scan path that is determined may be a single continuous path, a plurality of discrete paths or a series of discrete points to be exposed to the laser or electron beam in a specified order. The scan parameter operation may also comprise operations to determine scan speed, exposure time for discrete points, distance between discrete paths or points (so called point distance), scan pattern, laser or electron beam power and laser or electron beam spot size The processing unit may be arranged to receive a user selection of one or more of the objects located in the build volume and carry out the slicing and/or scan parameter operation on the selected objects without carrying out the slicing and/or scan parameter operation on unselected objects located within the common build volume.

The processing unit may be arranged to receive location data on the relative locations of the objects within the common build volume, wherein the processing unit can carry out the slicing and/or scan parameter operation on one object independently from another object upon selection of the object by the user whilst retaining the location data such that a location of the object on which the slicing and/or scan parameter operation has been carried out remains defined relative to the other objects.

Because location data is retained for the plurality of objects that are to be built together, an image can be displayed representing the relative locations of the objects as the objects are separately progressed through the design process. The user may be able to select the objects on which a slicing or scan parameter operation is to be carried out using this image. Accordingly, the apparatus may comprise a graphical user interface the graphical user interface arranged to display a representation of the objects and the relative build positions of the objects and receive selections from the user of one or more of the objects displayed, wherein, upon selection, the processing unit determines the sections and/or scan parameter for the or each selected object independently from the other objects.

In this way, objects can be separately progressed (or also possibly regressed) through the process of designing the build whilst the objects are displayed in a common view in which the user can view the relative build locations of the objects.

The user interface may comprise a display, a user input device, and the user can select through the user input device one or more of the objects, the processing unit arranged for determining sections and/or scan parameters for the selected object(s) whilst sections and/or scan parameters for the unselected object(s) are not determined, the processing unit causing the display to display the objects for which sections and/or scan parameters have been determined together with objects for which sections and/or scan parameters are undefined such the relative positions of the objects can be comprehended by the user.

Accordingly, the user has an intuitive interface for determining the make-up of the build, in particular, the locations of the objects, whilst allowing the user to separately progress different objects though the different stages of the design process. The user has the flexibility to move an object between operations through selection of that object without having to switch to a separate display window for that object, or transform all objects to that stage. The user may be able to select objects for which sections and/or scan parameters have been determined to move back into a stage wherein the sections and/or scan parameters are undefined. For example, this allows the user to re-orient the object if it is determined, after sectioning of the object and/or determining of the scan parameters, to change the orientation of the object.

Determination of the sections and scan parameters for each object may be carried out (from the point of view of the user) as a single operation. However, preferably, the user can select to determine the sections of an object in an independent operation from determining scan parameters of the object. Separation of these operations may be advantageous as the user may choose to make changes to the object after sectioning the object that may require the object to be re-sectioned (such as a re-orientation) and time has not been lost on determining the scan parameters based upon the sections before re-orientation.

The apparatus may be connected with an additive manufacturing machine, the processing unit arranged to send the generated geometric data to the additive manufacturing machine to control the additive manufacturing machine. Separate objects may be stored in the apparatus as separate models (such as separate instances of a class or other data structure in an object-oriented program), wherein operations can be independently carried out on the separate models. Preferably, each object is defined as an instance in each of a series of hierarchical classes or other data structures, where slicing and/or scan parameter operations may be carried out independently on an instance of a non-terminal class or other non-terminal data structure in the hierarchy. This may be appropriate when separate instances of classes or other data structures lower in the hierarchy that link to a single instance in the non-terminal class or other non-terminal data structure relate to attributes of the object that do not affect the sections and/or scan parameters. The carrying out of slicing and/or scan parameter operations on instances of a non-terminal class or other non-terminal data structure may result in faster processing because a single operation may determine sections and/or scan parameters for multiple objects.

For example, the sectioning of an object may be the same for objects having the same surface geometry and same rotational orientation about axes parallel to the plane of the sections but different rotations about an axis perpendicular to the plane of the sections. Accordingly, there may be a non-terminal class or other non-terminal data structure that defines an instance of objects that have a particular surface geometry and rotations about axes perpendicular to a plane of the sections, the processing unit arranged for carrying out the slicing operation independently on each instance of this non-terminal class or other non-terminal data structure. Classes or other data structures that are lower in the hierarchy than the non-terminal class or non-terminal data structure may define the orientation about the axis perpendicular to the plane of the sections and the location in the build volume.

The scan-parameter/scan path operation may not depend on the location of an object in a plane parallel to the sections and therefore, may be carried out independently on instances of a non-terminal class or non-terminal data structure for which the location of the object is not-defined.

According to a third aspect of the invention there is provided a method for generating geometric data for use in an additive manufacturing process, the method comprising receiving data, for example as STL files, defining surface geometry of a plurality of objects to be built together in an additive manufacturing process, providing a user interface that allows a user to define a location of each object within a common build volume and carrying out a slicing operation on at least one of the objects located in the common build volume independently from another one of objects located in the common build volume, the slicing operation determining sections of the at least one object to be built in the additive manufacturing process.

According to a fourth aspect of the invention there is provided a method for generating data for use in an additive manufacturing process, the method comprising receiving data, for example as STL files, defining surface geometry of a plurality of objects to be built together in an additive manufacturing process, providing a user interface that allows a user to define a location of each object within a common build volume, carrying out a slicing operation to determine sections of the objects to be built in the additive manufacturing process and, for each section, carrying out a scan parameter operation to determine scan parameters for a laser or electron beam to use when solidifying areas of a powder layer to form the section, wherein the processing unit can carry out the scan parameter operation on at least one of the objects located in the common build volume independently from another one of objects located in the common build volume.

According to a fifth aspect of the invention there is provided a data carrier having instructions thereon, the instructions, when executed by a processor, cause the processor to carry out the method of the third or fourth aspect of the invention.

According to a sixth aspect of the invention there is provided apparatus for generating geometric data for use in an additive manufacturing process, the apparatus comprising memory and a processing unit, the processing unit arranged to receive data defining surface geometry of objects, for example as STL files; for each object, and location data on the relative positions of the objects in a common build volume, and store the data for each object in a format in memory such that sections and/or scan parameters can be determined for at least one of the objects independently from another of the objects whilst the relative positions of the objects in a common build volume remain defined.

According to a seventh aspect of the invention there is provided a method for generating geometric data for use in an additive manufacturing process, the method comprising receiving data defining surface geometry of objects, for example as STL files; for each object, and location data on the relative positions of the objects in a common build volume; and store the data for each object in a format in memory such that sections and/or scan parameters can be determined for at least one of the objects independently from another of the objects whilst the relative positions of the objects in a common build volume remain defined According to an eighth aspect of the invention there is provided a data carrier having instructions thereon, the instructions, when executed by a processor, cause the processor to carry out the method of the seventh aspect of the invention.

According to a ninth aspect of the invention there is provided apparatus for generating geometric data for use in an additive manufacturing process, the apparatus comprising a processing unit arranged to receive data defining surface geometry of an object, for example an STL file, to identify supports to be used in supporting the object during the additive manufacturing process and to determine slices of the object and supports to be built as layers in the additive manufacturing process, wherein determining slices of the object and determining slices of at least one of the supports can be carried out as independent operations.

By decoupling the slicing operations, changes can be made to one of the supports and object after the slicing operations without necessitating re-slicing of the other one of the object or supports. This can result in significant time savings in generation of the geometric data as well as, particularly for the supports, a look-and-see functionality that allows the user to view slices of the object and whether they are supported before slicing the supports. Furthermore, if a user decides to change the supports after slicing of the object, such changes can be made without having to re-slice the object.

The processing unit may be arranged to generate scan parameters for the laser or electron beam for each section of the supports and/or object, the scan parameters stored in the apparatus such that a scan parameter for one, and preferably any one, of the sections can be re-generated without re-generating the scan parameters for other ones of the sections. By decoupling determination of the scan parameters for each section, changes made after the scan parameters have been generated may not necessitate re-generation of the scan parameters for all sections. For example, if a new support is added after generation of the scan parameters, scan parameters may only have to be generated for the added support and, possibly, the slice or slices of the object with which the support merges. This can result in significant time savings compared to re-generation of scan parameters for all sections when a change is made.

Generation of scan parameters for each section may be an operation that can be independently selected from the operation to determine slices of the object and/or supports. In this way, the user can select the operation for generating the scan parameters only once the user is satisfied with the slices and supports.

The object and supports may be stored as separate data models in the apparatus. During the steps of identifying the supports and slicing of the supports, the model for the supports may be stored in a transient memory, such as RAM, that can be accessed relatively quickly compared to non-transient (or durable) memory, such as a hard disk. Accordingly, the model of the supports may not be stored as a file during these operations, whereas the normally more complex model of the object is stored separately from the model of the supports as a file in non-transient memory. This allows quicker access to the model of the supports to facilitate rapid reprocessing when changes are made by the user.

By having the support model separate from the object model and the separate object models, an object that has already been sliced can be copied and placed at a different location on a build plate, such as a different height, that requires different supports from that of the copied model. Accordingly, even though it may be necessary to identify the supports for this copied object separately from the object that was copied, it may not be necessary to re-determine the slices for the copied object.

According to an tenth aspect of the invention there is provided a method for generating geometric data for use in an additive manufacturing process, the method comprising receiving data defining surface geometry of an object, for example an STL file, identifying supports to be used in supporting the object during an additive manufacturing process and determining slices of the object and supports to be built as layers in the additive manufacturing process, wherein determining slices of the object and determining slices of at least one of the supports can be carried out as independent operations.

According to an eleventh aspect of the invention there is provided a data carrier having instructions thereon, the instructions, when executed by a processor, cause the processor to carry out the method of the tenth aspect of the invention.

According to an twelfth aspect of the invention there is provided apparatus for generating geometric data for use in an additive manufacturing process in which a laser or electron beam solidifies selected areas in a powder layer, the apparatus comprising a processing unit arranged to receive data defining surface geometry of an object, for example an STL file, to determine slices of the object to be built as layers in the additive manufacturing process in which a laser or electron beam solidifies selected areas in a powder layer and to determine scan parameters for a laser or electron beam for each slice of the object, wherein the scan parameters can be re-determined for one of the slices of the object without re-determining the scan parameters for another one of the slices of the object.

According to an thirteenth aspect of the invention there is provided a method for generating geometric data for use in an additive manufacturing process, the method comprising receiving data defining surface geometry of an object, for example an STL file, determining slices of the object to be built as layers in the additive manufacturing process in which a laser or electron beam solidifies selected areas in a powder layer and determining scan parameters for a laser or electron beam for each slice of the object, wherein the scan parameters can be re-determined for one of the slices of the object without re-determining the scan parameters for another one of the slices of the object.

According to a fourteenth aspect of the invention there is provided a data carrier having instructions thereon, the instructions, when executed by a processor, cause the processor to carry out the method of the thirteenth aspect of the invention.

According to a fifteenth aspect of the invention there is provided apparatus for generating geometric data for use in an additive manufacturing process, the apparatus comprising memory and a processing unit arranged to receive data defining surface geometry of an object, for example an STL file, to identify supports to be used in supporting the object during the additive manufacturing process and to determine slices of the object to be built as layers in the additive manufacturing process, wherein a model of the object and determined slices is stored in the memory as a separate data entity from a model of the supports such that the model of the object and determined slices can be copied without copying the model of the supports.

According to a sixteenth aspect of the invention there is provided a method for generating geometric data for use in an additive manufacturing process, the method comprising receiving data defining surface geometry of an object, for example an STL file, identifying supports to be used in supporting the object during the additive manufacturing process and determining slices of the object to be built as layers in the additive manufacturing process, wherein a model of the object and determined slices is stored in memory as a separate data entity from a model of the supports such that the model of the object and determined slices can be copied without copying the model of the supports.

According to a seventeenth aspect of the invention there is provided a data carrier having instructions thereon, the instructions, when executed by a processor, cause the processor to carry out the method of the sixteenth aspect of the invention.

According to an eighteenth aspect of the invention there is provided apparatus for generating geometric data for use in an additive manufacturing process, the apparatus comprising a processing unit arranged to receive data defining surface geometry of a plurality of objects, for example STL files, to be built together in an additive manufacturing process, define the objects using hierarchical data structures (such as classes in an object-oriented program), each data structure providing an object definition defining further attributes of the objects, and carry out a slicing operation for determining sections of the at least one object to be built in the additive manufacturing process, wherein the slicing operation can be carried out on the object definitions provided by instances of a non-terminal data structure of the hierarchical data structures.

According to a nineteenth aspect of the invention there is provided apparatus for generating geometric data for use in an additive manufacturing process, the apparatus comprising a processing unit arranged to receive data defining surface geometry of a plurality of objects, for example STL files, to be built together in an additive manufacturing process, define the objects using hierarchical data structures, each data structure providing an object definition defining further attributes of the objects, carry out a slicing operation for determining sections of the at least one object to be built in the additive manufacturing process and, for each section, carry out a scan parameter operation to determine scan parameters for a laser or electron beam to use when solidifying areas of a powder layer to form the section, wherein the scan parameter operation can be carried out on the object definitions provided by instances of a non-terminal data structure of the hierarchical data structures.

Using such an arrangement, each instance of the non-terminal data structure may represent a group (set) of objects to be built in the additive manufacturing process, the sections and/or scan parameters for each group of objects being determined in a single operation on the instance of the non-terminal data structure that comprises the object definition for that group. In this way, determination of the sections and/or scan parameter may be quicker than would be the case if sections and/or scan parameters were determined as a separate operation on each object of the group. It has been recognised that certain attributes of the complete definition of an object do not affect the determination of the sections and/or scan parameters. For example, for the slicing operation, the location of an object and rotations of objects about an axis perpendicular to the plane of the sections may not affect the sections that are determined. Accordingly, a non-terminal data structure may define other attributes that do affect sectioning, such as surface geometry and rotational orientation about axes parallel to the plane of the sections, the slicing operation carried out on instances of this non-terminal data structure. In this way, sections of objects of a group that have common surface geometry and common rotational orientation about axes parallel to the plane of the sections can be determined in a single operation on the general object definition provided by the corresponding instance of the non-terminal data structure. Similarly for a scan path operation, the location of objects in the plane of the sections may not affect the determination of the scan path.

Selection of different sectioning and/or scanning strategies may change the data structures that are used to determine the sections and/or scan parameters of the objects. For example, a scanning strategy may be selected wherein the locations of the objects in the plane of the sections will affect the scan path used for a section. For example, U.S. patent application 61/791,636, International patent application No: PCT/GB2014/050389, United Kingdom patent application 1303920.1 and International patent application No: PCT/GB2014/050417 disclose scanning strategies wherein the location of an object in a powder bed can affect the scan path used for the object.

According to a twentieth aspect of the invention there is provided a method for generating geometric data for use in an additive manufacturing process, the method comprising receiving data defining surface geometry of a plurality of objects, for example STL files, to be built together in an additive manufacturing process, defining the objects using hierarchical data structures, each data structure providing an object definition defining further attributes of the objects, and carrying out a slicing operation for determining sections of the at least one object to be built in the additive manufacturing process, wherein the slicing operation can be independently carried out on the object definitions provided by instances of a non-terminal data structure of the hierarchical data structures.

According to a twenty-first aspect of the invention there is provided a method for generating geometric data for use in an additive manufacturing process, the method comprising receiving data defining surface geometry of a plurality of objects, for example STL files, to be built together in an additive manufacturing process, defining the objects using hierarchical data structures, each data structure providing an object definition defining further attributes of the objects, carrying out a slicing operation for determining sections of the at least one object to be built in the additive manufacturing process and, for each section, carrying out a scan parameter operation to determine scan parameters for a laser or electron beam to take in solidifying areas of a powder layer to form the section, wherein the scan parameter operation can be carried out on the object definitions provided by instances of a non-terminal data structure of the hierarchical data structures.

According to a twenty-second aspect of the invention there is provided a data carrier having instructions thereon, the instructions, when executed by a processor, cause the processor to carry out the method of the twentieth or twenty-first aspect of the invention.

According to a twenty-third aspect of the invention there is provided apparatus for generating geometric data for use in an additive manufacturing process, the apparatus comprising memory and a processing unit, the processing unit arranged to receive data defining surface geometry of an object, for example an STL file, to be built in an additive manufacturing process, provide a definition of a standard cross-section for a support in the memory, receive data identifying two or more supports for supporting the object during the build, the supports having a cross-section corresponding to the standard cross-section, and define each of the two or more supports using a data structure in which the cross-section of each support is defined by reference to the standard cross-section held in the memory.

According to a twenty-fourth aspect of the invention there is provided apparatus for generating geometric data for use in an additive manufacturing process, the apparatus comprising memory and a processing unit, the processing unit arranged to receive data defining surface geometry of an object, for example an STL file, to be built in an additive manufacturing process, provide a definition of a standard cross-section for a support in memory, receive data identifying a support for supporting the object during the build, the support having a plurality of cross-sections corresponding to the standard cross-section, and define the support using a data structure in which each of the plurality of cross-sections of the support is defined by reference to the standard cross-section held in the memory.

In designing a build for additive manufacturing it is common for the support(s) for supporting the object to be based on a standard cross-sectional shape. Typically the supports will be prismatic shapes and may have cross-sections that are regular polygons, such as circular, rectangular, pentagonal, or hexagonal cross-section.

Accordingly, by storing an instance of data defining the standard cross-sectional shape and using this instance to define a cross-section of multiple supports and/or multiple cross-sections of the or each support, the amount of data held for defining the support(s) may be reduced.

Furthermore, a definition of other attributes of the standard cross-section, such as scan parameters for a laser or electron beam to use when solidifying areas of powder to form the standard cross-section, can be held in memory and the data structure defining the support may define the attributes for the or each cross-section of the support by reference to the attributes for the standard cross-section. The scan parameters may comprise a scan path for the laser or electron beam to take when solidifying the powder material to areas of powder to form the cross-section(s) of the support.

The or each support may comprise a tapering portion having a cross-section with a shape that corresponds to a shape of the standard cross-section but a different size. The processing unit may be arranged to define the support using a data structure in which the cross-section of the tapering portion of the support is defined by reference to the standard cross-section held in the memory and one or more tapering parameters, for example tapering length. The processor may be arranged to determine a cross-section of the tapering portion from a transformation of the standard cross-section, the transformation determined from the tapering parameters. To determine the cross-section of the tapering portion the standard cross-section may be scaled based upon the tapering parameters. A scan path defined for the standard cross-section may not be scaled but may be discontinued at borders corresponding to the scaled cross-section to obtain a scan path for the cross-section of the tapered portion. The tapering portion may be a top portion of the support and/or a bottom portion of the support. The tapering portion may provide a weakened/frangible region that facilitates removal of the support from the object/build plate Scan parameters may be determined for the standard cross-section in advance of a user selecting supports for supporting the object. For example, the memory may hold one or more scan paths for each standard cross-section, the scan path selectable by a user. The scan paths for these standard cross-sections may have been determined by another processing system. Alternatively, a new standard cross-section for one or more supports may be provided/designed by a user and/or by the processing unit and the processing unit is arranged to carry out a scan path operation on the new standard cross-section provided by the user to determine the scan path(s).

The standard cross-section may be defined as a 2-dimensional shape in memory.

According to a twenty-fifth aspect of the invention there is provided a method for generating geometric data for use in an additive manufacturing process, the method comprising receiving data defining surface geometry of an object, for example an STL file, to be built in an additive manufacturing process, providing a definition of a standard cross-section for a support in memory, receiving data identifying two or more supports for supporting the object during the build, the supports having a cross-section corresponding to the standard cross-section, and defining each of the two or more supports using a data structure in which the cross-section of each support is defined by reference to the standard cross-section held in the memory.

According to a twenty-sixth aspect of the invention there is provided a method for generating geometric data for use in an additive manufacturing process, the method comprising receiving data defining surface geometry of an object, for example an STL file, to be built in an additive manufacturing process, providing a definition of a standard cross-section for a support in memory, receiving data identifying a support for supporting the object during the build, the support having a plurality of cross-sections corresponding to the standard cross-section, and defining the support using a data structure in which each of the plurality of cross-sections of the support is defined by reference to the standard cross-section held in the memory.

According to a twenty-seventh aspect of the invention there is provided a data carrier having instructions thereon, the instructions, when executed by a processor, cause the processor to carry out the method of the twenty-fifth or twenty-sixth aspect of the invention.

According to a twenty-eighth aspect of the invention there is provided a data carrier having geometric data thereon, the geometric data defining an object to be built using an additive manufacturing process and a plurality of supports for supporting the object during the build, the geometric data further defining a series of sections of the object to be built successively in the additive manufacturing process and, for each section, scan parameters for a laser or electron beam to use in solidifying material to form the section, and the geometric data identifying a section of each support having a common cross-section and scan parameters for a laser or electron beam to use in solidifying material to form the sections having that common cross-section.

According to a twenty-ninth aspect of the invention there is provided a data carrier having geometric data thereon, the geometric data defining an object to be built using an additive manufacturing process and a support for supporting the object during the build, the geometric data further defining a series of sections of the object to be built successively in the additive manufacturing process and, for each section, scan parameters for a laser or electron beam to use in solidifying material to form the section, the geometric data identifying a common cross-section for a plurality of sections of the support and scan parameters for a laser or electron beam to use in solidifying material to form the sections having that common cross-section.

By identifying a shape of multiple supports and/or multiple cross-sections of the or each support with reference to a common/standard cross-section, the size of digital information required for the geometric data may be reduced.

The data carrier of the above aspects of the invention may be a suitable medium for providing a machine with instructions such as non-transient data carrier, for example a floppy disk, a CD ROM, a DVD ROM/RAM (including -R/-RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

DESCRIPTION OF THE DRAWINGS

Embodiments of the invention will now be described, by example only, with reference to the accompanying drawings, in which: —

DESCRIPTION OF EMBODIMENTS

Figure 1:
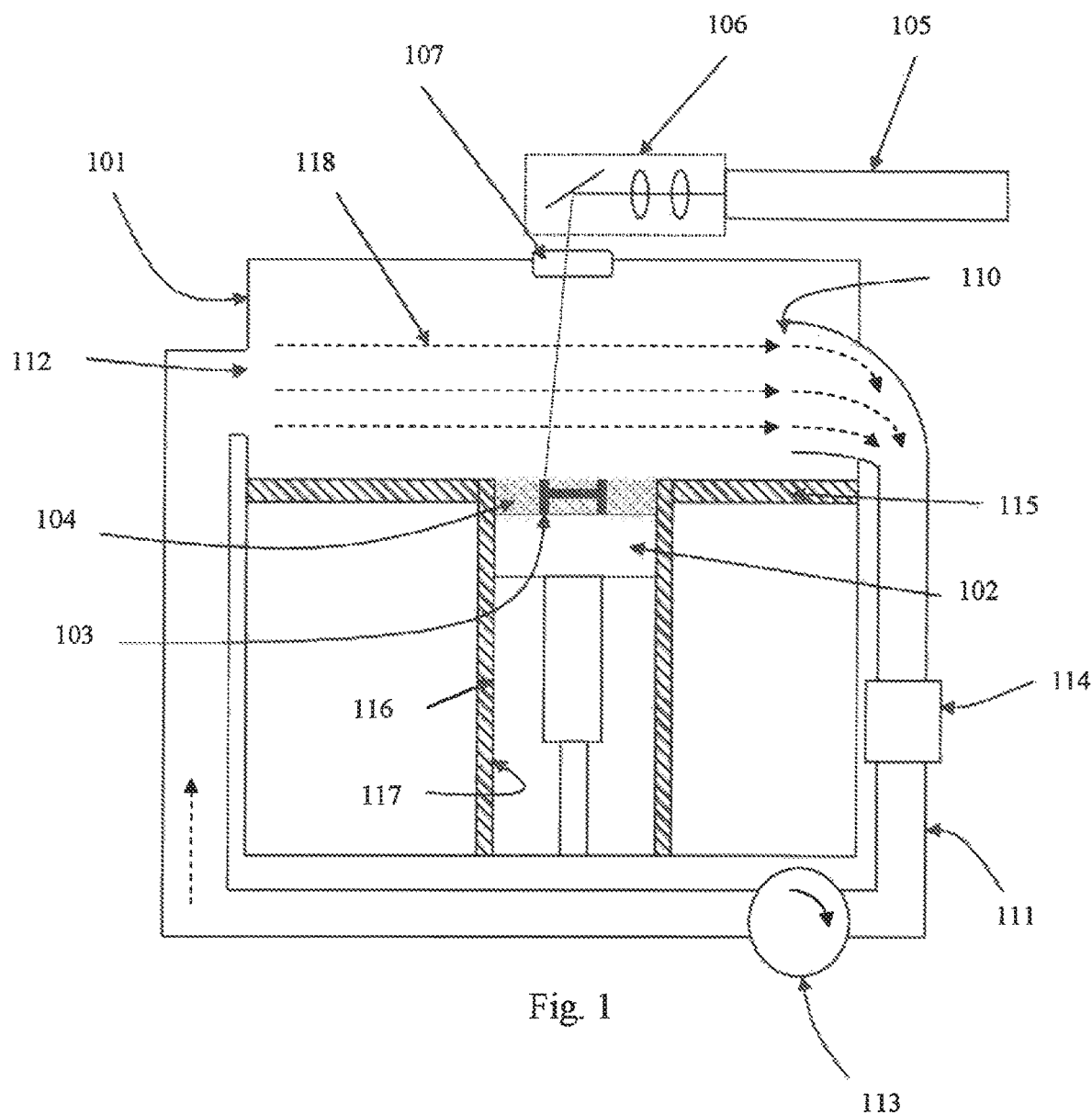
FIG. 1 shows a laser solidification apparatus according to an embodiment of the invention.
Figure 2:
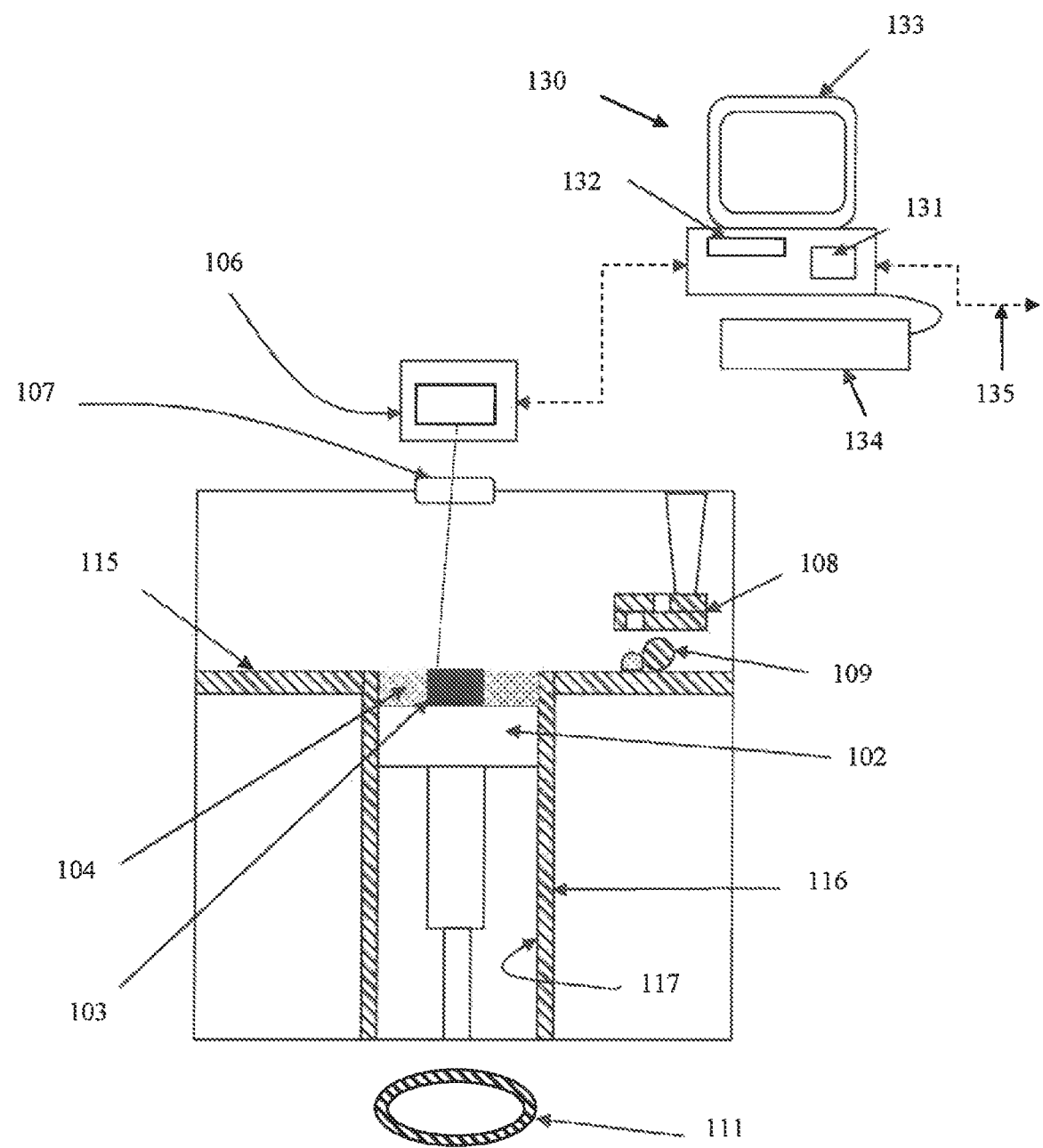
FIG. 2 shows the laser solidification apparatus shown in FIG. 1 from a different side.

Referring to FIGS. 1 and 2, a laser solidification apparatus according to an embodiment of the invention comprises a main chamber 101 having therein partitions 115, 116 that define a build chamber 117 and a surface onto which powder can be deposited. A build platform 102 is provided for supporting an object 103 built by selective laser melting powder 104. The platform 102 can be lowered within the build chamber 117 as successive layers of the object 103 are formed. A build volume available is defined by the extent to which the build platform 102 can be lowered into the build chamber 117. Layers of powder 104 are formed as the object 103 is built by dispensing apparatus 108 and a wiper 109.

For example, the dispensing apparatus 109 may be apparatus as described in WO2010/007396. A laser module 105 generates a laser for melting the powder 104, the laser directed as required by optical module 106 under the control of a computer 130. The laser enters the chamber 101 via a window 107.

An inlet 112 and outlet 110 in chamber 101 are arranged for generating a gas flow across the powder bed formed on the build platform 102. The inlet 112 and outlet 110 are arranged to produce a laminar flow having a flow direction from the inlet to the outlet, as indicated by arrows 118. Gas is re-circulated from the outlet 110 to the inlet 112 through a gas recirculation loop 111. A pump 113 maintains the desired gas pressure at inlet 112. A filter 114 is provided in the recirculation loop 111 to filter from the gas condensate that has become entrapped in the flow. It will be understood that more than one inlet 112 may be provided in the build chamber 101. Furthermore, rather than extending outside of the chamber 101, the recirculation loop 111 may be contained within the chamber 101.

Computer 130 comprises a processor unit 131, memory 132, display 133, user input device 134, such as a keyboard, touch screen, etc, a data connection to modules of the laser melting unit, such as optical module 106 and laser module 105, and an external data connection 135. Stored on memory 132 is a computer program that instructs the processing unit to carry out the method as now described.

Typically, an object to be built will be designed in appropriate software, such as CAD. In such a software design package, the object is usually defined in a way that is unsuitable for use in determining sections and scan parameters, such as a scan path, for the laser in building the object using selective laser melting. To determine a scan path, it may only be necessary to consider the bounds of the object, making a format that defines the surface geometry of the object, such as an STL file, a suitable format for defining the object. Accordingly, as a first step the CAD data is converted into an STL format. A suitable conversion program may be provided on computer 130 or such a conversion may be carried out remote from the system. Conversion of the CAD file into an STL file may require fixing of the data to ensure that is meets certain requirements for use in determining sections and a scan path. For example, ill-defined regions in the surfaces may have to be fixed. The fixing of the data can be done using conventional software. The object defined in the STL file is imported into the computer program stored on computer 130.

For a single build in an additive manufacturing machine, it is common to build a plurality of objects together. For designing such a build, a plurality of objects may be imported, such as in the form of STL files, into an application program running on computer 130 or a single object may be imported and copies of the object made in the application program. In either case, data is provided defining a surface geometry of a plurality of objects.

Figure 3:
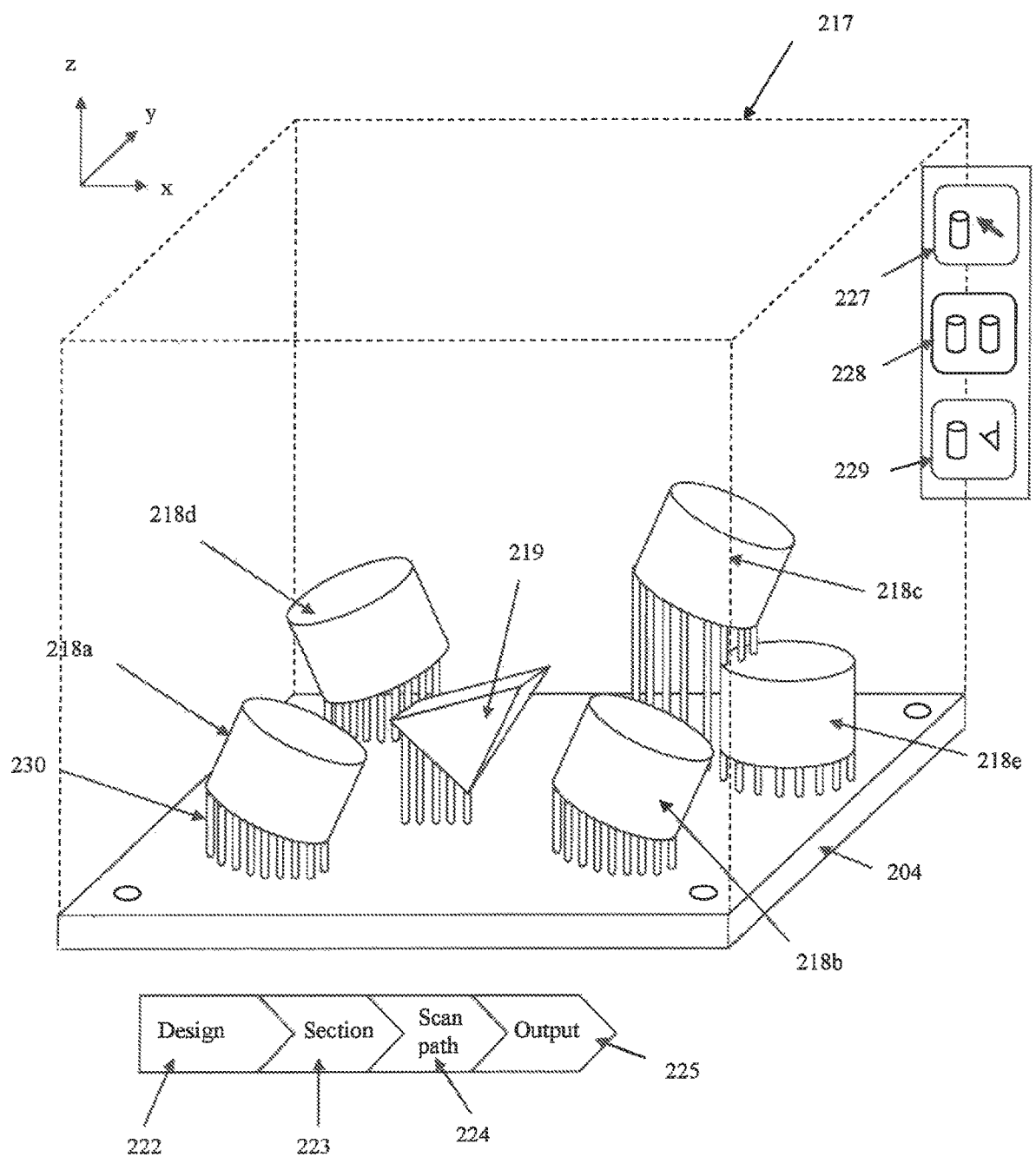
FIG. 3 shows a user interface comprising a representation of objects with supports on a build plate and the build volume that is available.

A user interface of an application program is shown in FIG. 3. Such a user interface may be displayed on display 133. The user interface comprises a graphical depiction of the build platform 204 and the available build volume 217. Two different geometric objects 218, 219 have been imported into the application program and copies have been made of object 218 to provide five instances of the objects 218a, 218b, 218c, 218d and 218e. The user interacts with the computer 130 through the input device 134 to orient and locate each object 218a, 218b, 218c, 218d, 218e and 219 in the build volume 217.

There are four stages in the build process, design, sectioning, determining a scan path and outputting the data for controlling the build. The user can toggle between each stage for each object by selecting the object and then selecting icons/graphical buttons 222, 223, 224 and 225 with a pointing device or by touching a touch screen. Accordingly, different objects can be at different stages of the design process. The buttons 222 to 225 may change colour or otherwise change appearance to indicate to the user the stage of the process that has been selected for a particular object.

In the design phase, a user can locate and orient the object(s) in the build volume 217. This may be achieved using a pointing device/touch to select an object and appropriate combinations of button/key operations and movement of the pointer/finger to orient and locate the object. Once the user is happy with the orientation and location of the object in the build volume, the user can select object(s) and then the "Section" button 223, which will cause the processing unit 131 to slice the object(s) and any supports into sections to be built in the layer-by-layer selective laser melting process. By toggling to this stage, the orientation and, possibly, also the location, of the selected objects may become fixed, the user having to toggle back to the "Design" stage to change the orientation and location. Re-orientation of the object will require the object to be re-sliced and it is likely that the time it takes to slice an object with a conventional desk-top computer (typically tens of seconds, although it will depend on the shape and size of the object) will be too long to provide a user friendly experience if re-slicing was carried out in real-time with re-orientation of the object. However, suitably fast computers may be able to carry real-time re-slicing of the object within an acceptable time period such that re-slicing of the object in "real-time" with changes in orientation may provide an acceptable user experience. In such a scenario, it would not be necessary to lock in the orientation of the object when the user toggles to the sectioning stage. As described below in more detail, rotational orientation of an object about the z-axis and location of an object do not affect the sectioning on the object. Accordingly, in one embodiment, the user is able to alter these attributes after the slicing operation.

The user can then select one or more objects that are at the "Section" stage and toggle to the scan path stage using button 224. During this stage, the processing unit 131 determines a scan path for the laser when forming each section of the selected object(s) and supports.

In a final stage, the scan path and other geometric data is output to the laser solidification apparatus for controlling build of the object. The user activates this operation by selecting button 225.

During the design, sectioning and scan path stages, the user can generate supports 230 for supporting the object(s) during the build. Icons/graphical buttons 227, 228, 229 are provided for the user to create supports.

The computer software comprises an algorithm for automatically generating supports 230 for selected objects. First the user selects the objects for which he/she wants supports 230 to be automatically generated. Then the user selects button 228 or 229 to cause the processing unit to generate supports in accordance with a specified algorithm depending upon which button 228 or 229 is selected. Selection of button 228 causes supports to be generated based on set spacing between each support. Use of such an algorithm to generate supports may be appropriate when the downwardly facing surface(s) of the object is reasonably flat and has a small angle of inclination, such as less than 45 degrees, to the vertical (z-axis).

Selection of button 229 causes supports to be generated by the processing unit based upon an angle of inclination of downwardly facing surfaces of the object. If the angle of the downwardly facing surface to the horizontal (plane of the build plate), is below a threshold angle, such as above 45 degrees, supports may be provided for that surface of the object.

It may be possible to use these two methods of automatically generating supports in combination.

A user can manually generate supports by selecting button 227. Selection of this button allows the user to individually orient and locate supports as required.

Selecting buttons 227 to 229 may take the user to a sub-menu (not shown) in which the user can select the type of support that he/she wants to use. For example, the user may be able to select the shape of the support, such as cylindrical or elongate in the horizontal plane, and the type of connection to the object, such as a tapering end or a series of tapering regions that provide weakened break points for separating the support from the object. Examples of supports with weakened break points that may be selectable are disclosed in EP0655317A1, EP1120228 and U.S. Pat. No. 7,084,370B2. Other types of supports may be selectable, such as lattice or tree-like support structures, for example as disclosed in U.S. Pat. No. 5,595,703.

The data representing the supports generated in these processes is stored in RAM memory separate from the data structure, described in more detail below, which defines the object associated with these supports.

Supports can be generated by selection of buttons 227 to 229 at the Design, Sectioning or Scan path stages of the design process. If a support is added at the Sectioning stage then the support is automatically sliced when it is added. If the support is added at the Scan Path stage then the support is automatically sliced and scan paths determined for each slice when the support is added. The slicing and determination of the scan paths for supports added during the Sectioning and Scan Path stages do not require the entire object and other supports that are associated with the object that have already been sliced to be re-sliced and the scan paths for these sections to be re-determined. Only the supports that have been added are sliced and scan paths for these slices of the added support, and possibly, also bottom slices of the object intersecting the added support, determined. This will now be described in more detail. The supports may be described in the data structures described below with reference to FIGS. 11 to 13. In such a data structure, the sections, and optionally, scan paths, are predefined and addition of a support is achieved by reference to the predefined sections and scan paths. With such a data structure, addition of a standard support does not require sectioning of a three-dimensional model.

Figure 4:
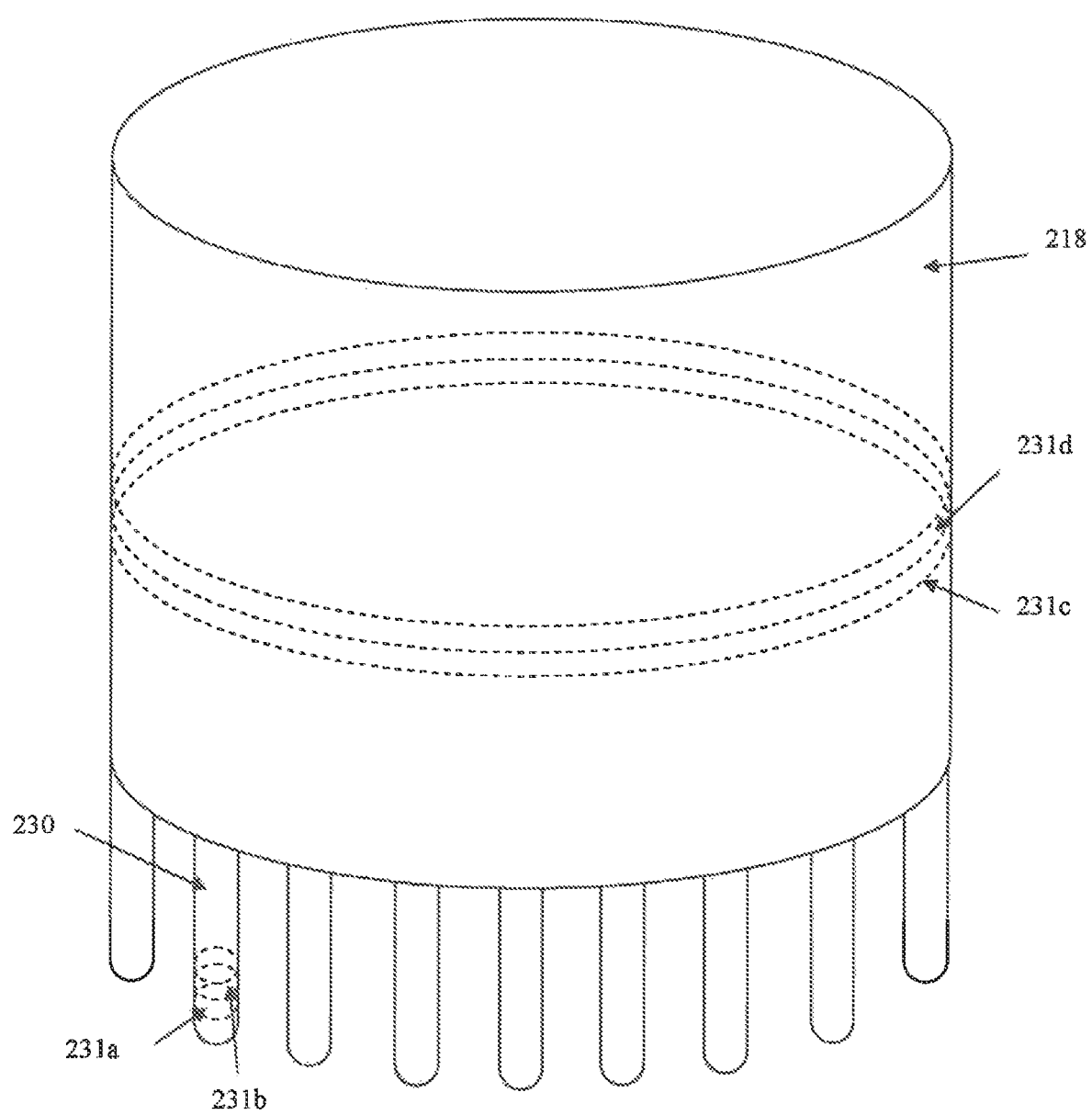
FIG. 4 shows the slicing of an object into different sections.

FIG. 4 illustrates how an object 218 and supports 230 may be sliced into different sections 231*a*, 231*b*, 231*c*, 231*d*. Typically, the user will design at least some supports before slicing the object because adding and manipulating a large number of supports will be quicker during the design stage than during later stages as supports added during later stages will be sliced when they are added meaning that global changes to a large number of supports during the later stages could cause significant delays. However, it is not necessary to add supports before slicing an object. The slices are determined based upon a preselected layer thickness and separately for the supports and object, i.e. there is no merging of the supports with the object at the sectioning stage.

Figure 5:
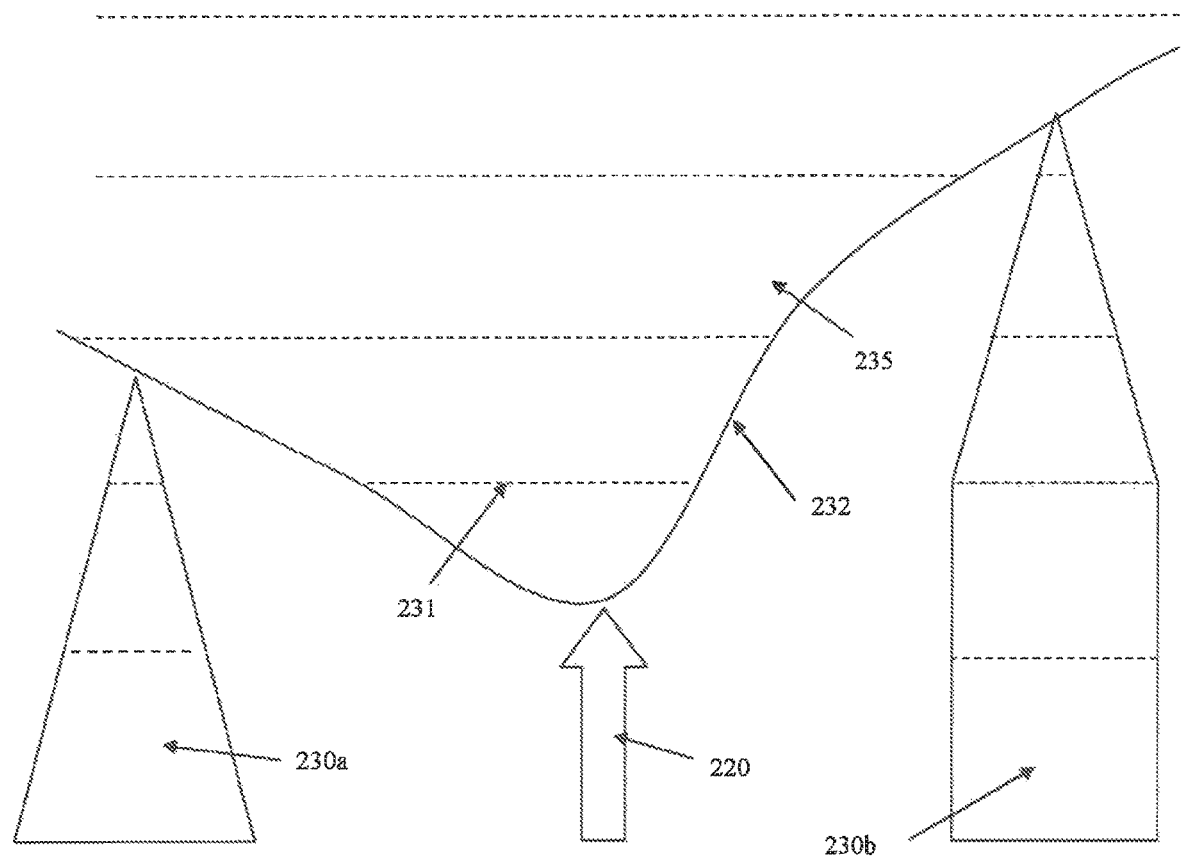
FIG. 5 is a close-up of an object and supports, wherein the sections of the object and supports are illustrated.

FIG. 5 is a close up of a lower region of an object 235 and associated supports 230 that has been sliced into sections 231. In this Figure, the supports 230 are shown to taper to provide weakened regions to ease separation of the supports 230 from the object 235. The user may review the object and supports after slicing to determine whether there are any regions of the object that need supporting but currently lack a support. As indicated by arrow 220, there is an unsupported region between supports 230*a*, 230*b* that would be initially unsupported until the region joins supported regions through the formation of higher layers. Accordingly, a support should be provided for supporting the initial layer that begins the formation of this region. Such regions may become more apparent after the object has been sliced.

Determining a scan path for the slices comprises merging the support 230 with the object 235 and determining the scan path for the merged object and supports.

Figure 6:
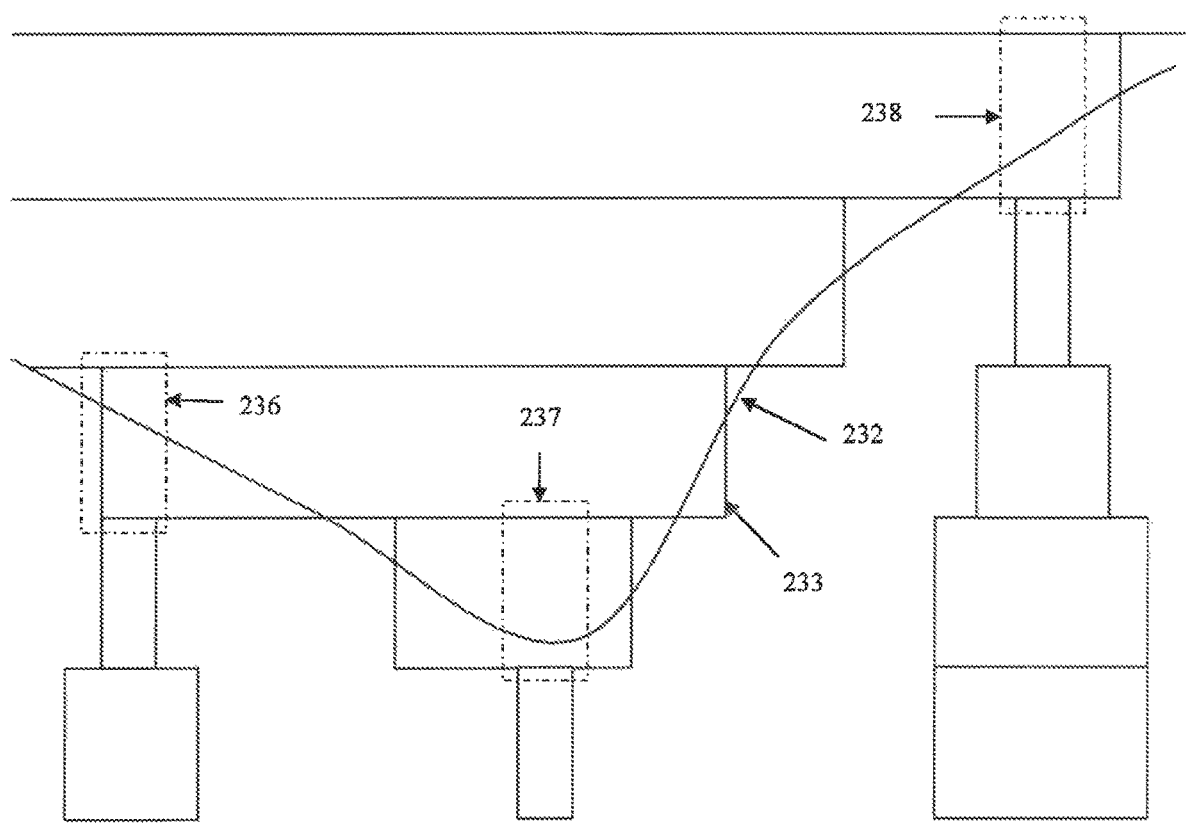
FIG. 6 shows how slicing of an object is translated into areas to be solidified.

The minimum unit (voxel) that can be built is dictated by the size of the melt pool that is created using the apparatus, which itself is dictated by the laser spot diameter, exposure time and laser power. Accordingly, even through surfaces of the object and supports may be defined as a relative smooth series of curves or lines 232, as shown in FIG. 5, what can be built is stepped sections 233, as illustrated by FIG. 6. Accordingly, when determining a scan path, a decision has to be made as to how large to make the rectangular-section layers 233 based on the previous curvilinear surfaces 232. In FIG. 6, the rectangular-section layer 233 is selected to extend to a point at which the surface 232 is at a height that is less than half the depth of a slice 231.

The slices of the object may be scanned with a different scanning strategy and different laser and scan parameters, e.g. spot size, laser power, scan speed, than for slices of the supports. Accordingly, for each area to be scanned, a decision has to be made whether it is an area of the object 235 or an area of a support 230. As can be seen from FIG. 6, for certain regions, indicated by the dotted and dashed lines 236, 237 and 238, the region partly forms the object 235 and partly forms a support 230. Accordingly, a decision has to be made as to whether this region is part of the support 230 or part of the object 235, which will dictate the parameters used to form the region. Such "merging" of the supports with the object may be carried out in the 2-dimensional representations of the slices rather than in the 3-dimensional representations. For example, if an area of layer to be solidified is stipulated as both object and support then this area will be allocated the scan parameters in accordance with set rules for resolving such a conflict. In this embodiment, any region/area 236, 237 and 238 that comprises part of the object 235 is selected to be scanned using the scan parameters selected for the object 235.

Figure 7A:
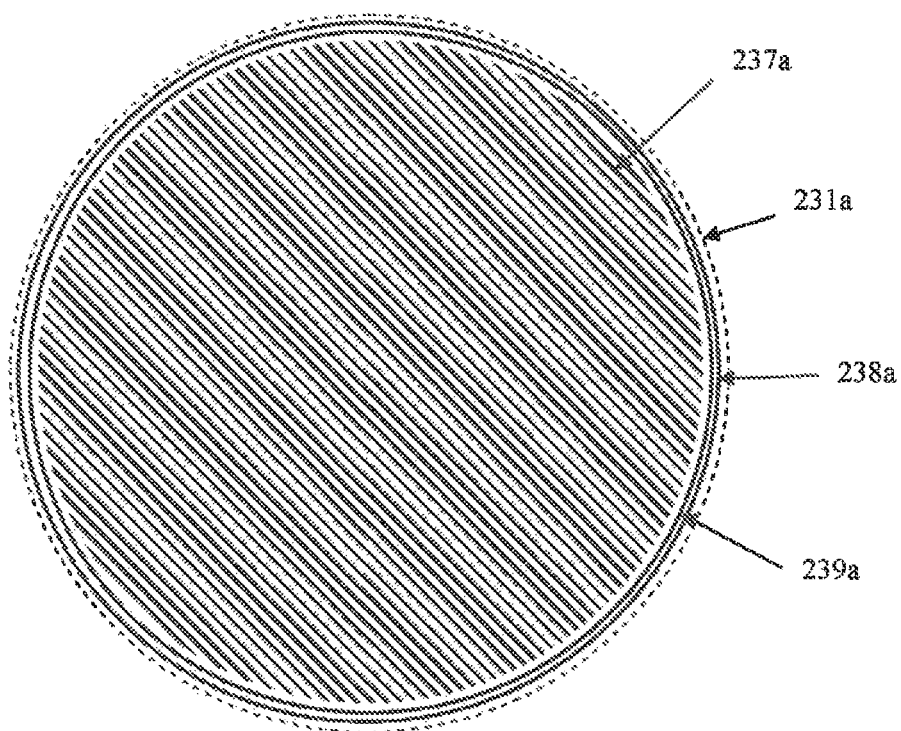
FIGS. 7a and 7b illustrate scan paths determined for different slices of the object.
Figure 7B:
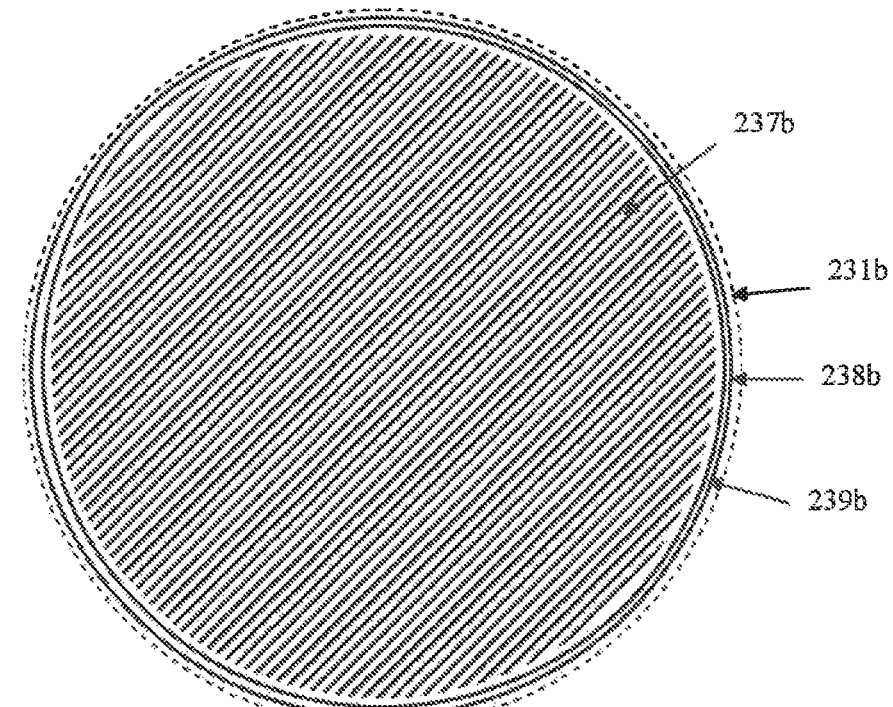

Once each area of each slice has been identified as part of the object or part of the support, a scan path for those areas can be determined. FIGS. 7a and 7b show the scan paths for consecutive areas of the object 235. In this embodiment, the scan strategy comprises a "hull and core" scanning strategy, wherein a core of an area to be solidified is scanned using a meander or raster scan 237a, 237b and an outer skin of the area is scanned using a two parallel perimeter scans 238a, 238b and 239a, 239b. Between consecutive slices, the direction of the raster scan is changed by a predefined amount, in this embodiment by 90 degrees.

The user can review the scan paths and decide whether or not further supports 230 should be added. If further supports are added at the scanning stage, these supports will be sliced and scan paths determined whilst the object and supports that have already been sliced and for which scan paths have already been determined will in the main be unaffected. One exception to this rule is where the added support meets the object. For this region of the object, a scan path/scan paths may have to be re-determined for the slice or slices of the object that contact the added support, as the boundaries of these slices may have to be altered.

Each section is defined as a 2-dimensional object and the scan paths are determined independently for each section based on the 2-dimensional representation. As each section is treated as a separate data object, the determination of the scan parameters, such as a scan path, may be carried out using parallel processing with different processing units (such as separate processors or separate cores of a multi-core processor) determining the scan parameters for different sections.

Once the user is happy with the planned build, the user can select button 225 to output geometric data that defines the scan path for the laser beam to take in solidifying the powder material to build the objects using the additive manufacturing process.

Figure 10:
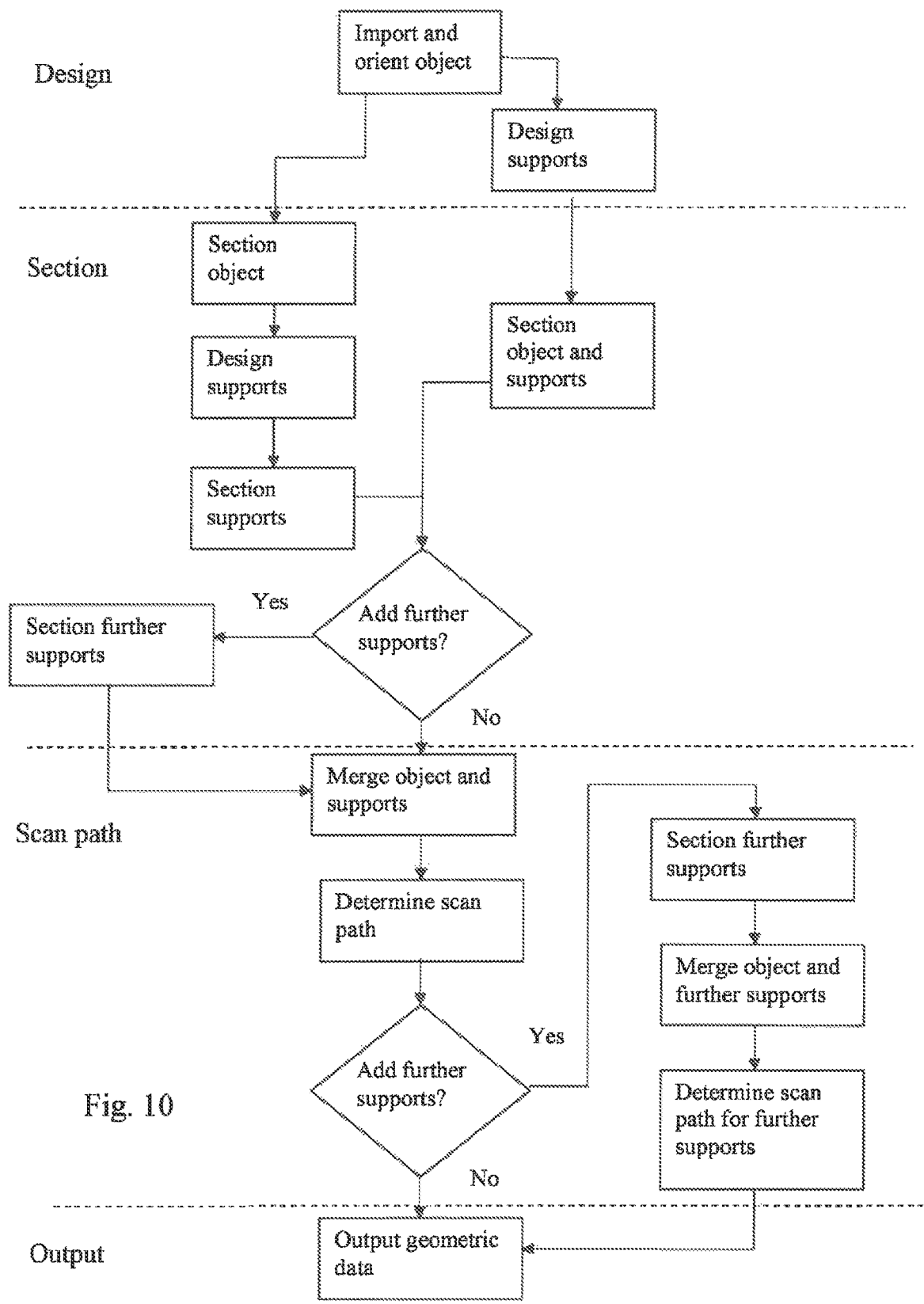
FIG. 10 is a flowchart illustrating how supports can be added at different stages of the design process.

FIG. 10 gives an overview of the planning process, illustrating different actions that can occur at each stage of the planning process. In particular, FIG. 10 illustrates that at the design, sectioning and scan path stages, supports can be added without having to recalculate slices and scan paths that have already been calculated. In this way, the user has the flexibility to add in additional supports at each stage without this significantly extending the time it takes to generate geometric data to be used to control the build process.

At each stage of the build process it may also be possible to copy a selected object or support. For example, a user may first slice an object 218a before copying the object and locating the replica object 218c at a different location in the build volume 217. The processing unit does not recalculate slices for the copied object 218c but uses the slices that have been determined for object 218a for object 218c. However, the different location of the copied object 218c may mean the object 218c requires different supports 230 to that of object 218a. Accordingly, the flexibility in being able to add supports 230 at the different stages allows the user to alter the supports 230 for a copied object 218c without having to re-slice the object 218c.

Figure 8:
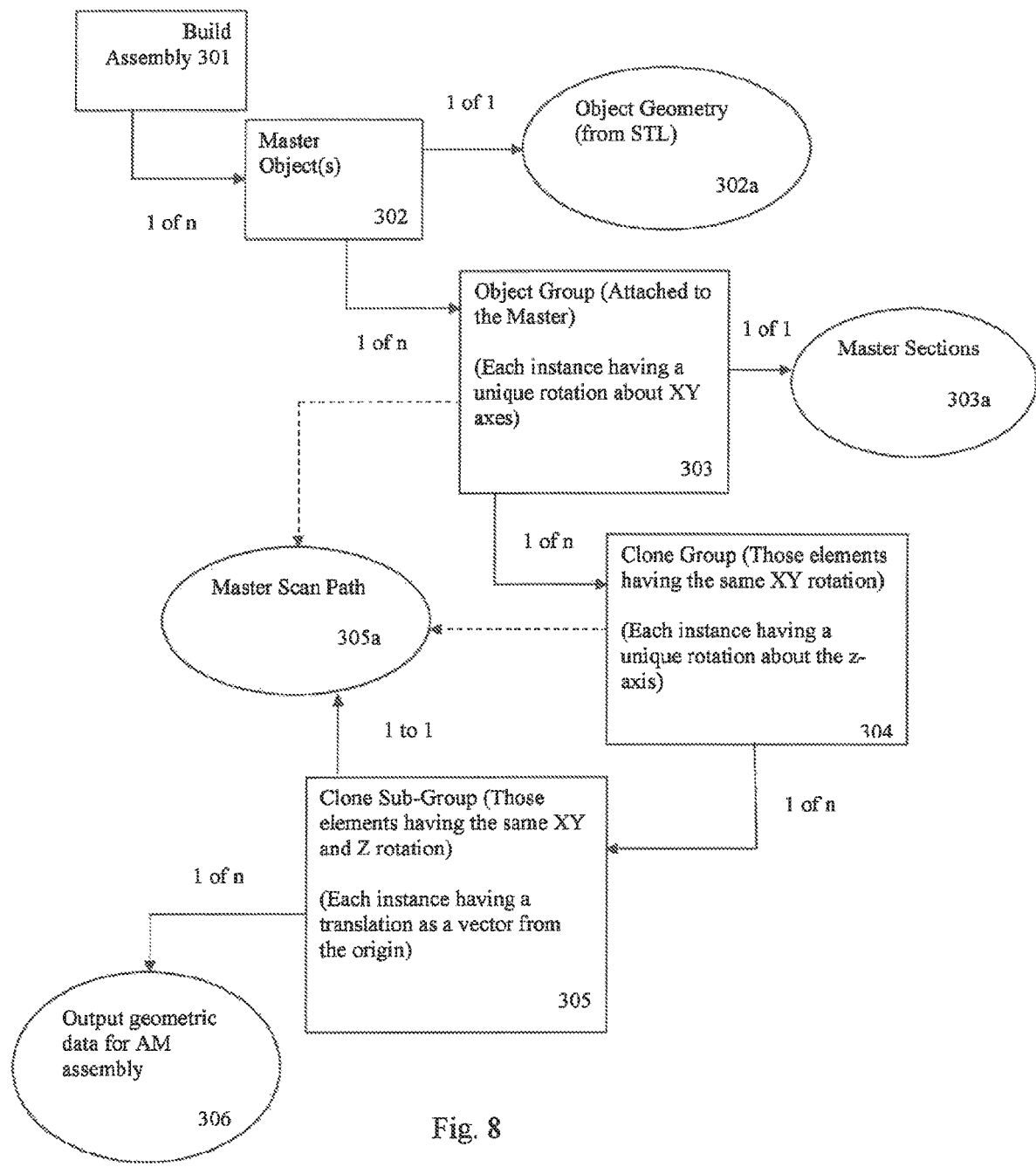
FIG. 8 is a flow chart illustrating the hierarchical class structure used for defining the objects.
Figure 9:
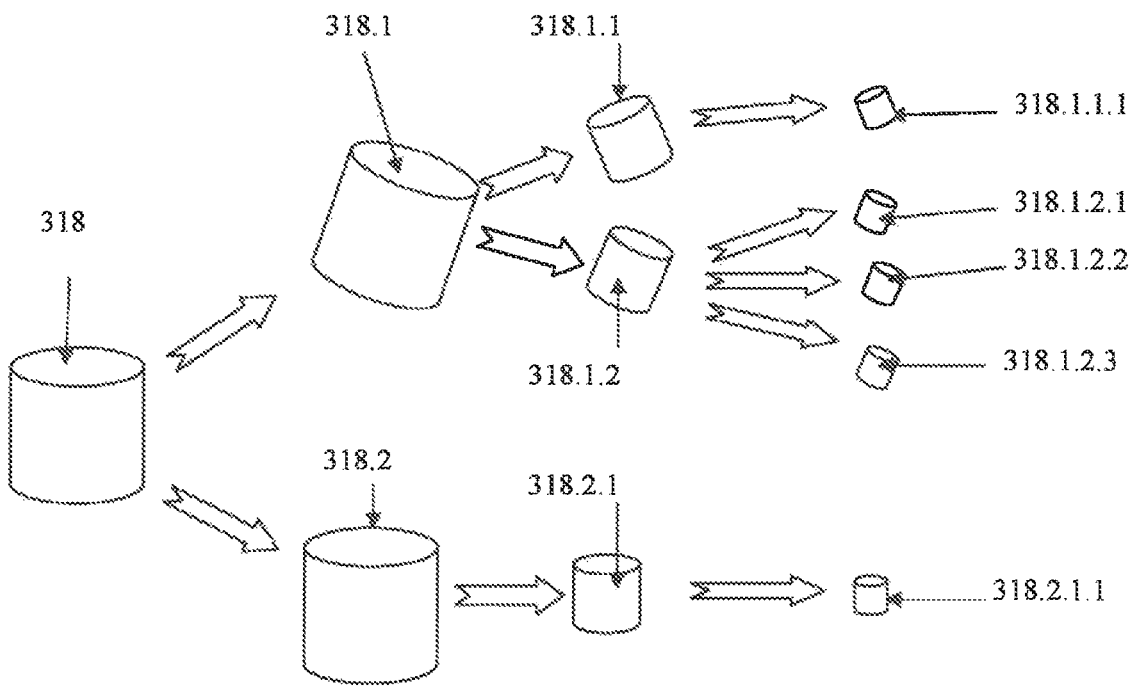
FIG. 9 is a pictorial representation of the hierarchical class structure used for defining the objects.
Figure 9:
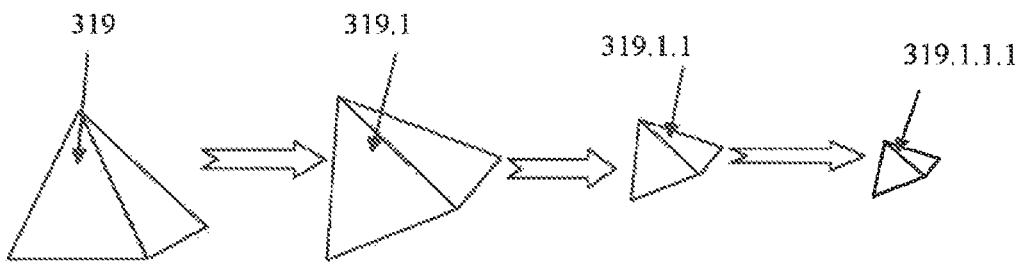

In order to achieve this function, the objects are defined in a hierarchical class structure. Referring to FIGS. 8 and 9, the user opens a build assembly design interface, such as shown in FIG. 3. Each build assembly is defined by an instance of a build assembly class 301. Each instance of a build assembly class describes objects of the build in a series of hierarchical classes. In this embodiment, the build assembly class describes the build using a Master Object class, Object Group class, Clone Group class and Clone Sub-Group class.

Each object in the build having a different surface geometry 302a is defined by a separate instance 318, 319 of the Master Object class 302. For example, in the build assembly design interface shown in FIG. 3, objects 218 and 219 constitute master objects because these objects have different surface geometry. FIG. 9 also illustrates two master objects 318 and 319. However, it will be understood that a build may comprise one or more master objects. The Master Object class describes a surface geometry of each master object as a triangulated surface, defining a plurality of triangles and the triangles connectivity. In this embodiment, the Master Object class is not in the standard STL format but can be determined therefrom. Accordingly, the user imports an STL file describing each master object and the application program is arranged to convert the STL file into a description of the object in accordance with the definition required for the Master Object class.

The user can then use the user interface to make copies of the master objects, as required, and orient each instance (one or more) of each master object. For example, in FIG. 3, there are five instances 218a, 218b, 218c, 218d and 218e of master object 218 and one instance of master object 219. Instances 218a, 218b and 218c have the same orientation, whereas instances 218d and 218e have different orientations. However, instance 218d has the same rotation about the x and y-axes that are parallel to the build platform 204 as instances 218a, 218b and 218c but a different rotational orientation about the z-axis. Instance 218e has a different rotational orientation about all three x, y and z axes.

The Object Group class 303 describes each instance of a master object having a unique rotation about the x and y axes. So, for FIG. 3, objects 218a to 218d are one instance of a unique rotation of master object 218 about the x and y axes and object 218e is another instance of a unique rotation of master object 218 about the x and y axes. FIG. 9 illustrates separate instances of the Object Group as 318.1, 318.2 and 319.1. A slicing operation is carried out on each instance of the Object Group to determine sections for the object. In this embodiment, the determined sections are stored as an instance of a Master Section class 303a and each instance of the object Group class has a corresponding instance of the Master Section class that defines the sections for the group of objects defined by that instance of the Object Group class. For example, in FIG. 3, the same sectioning data as defined in an instance of the Master group class will apply to objects 218a to 218d and, similarly, in FIG. 9, the same sectioning data as defined in an instance of the Master group class will apply to objects 318.1.1.1, 318.1.2.1, 318.1.2.2 and 318.1.2.3.

A possible advantage of using a hierarchical class structure to describe the objects to be built, including the Object Group class, is that, if a number of copies of an object are to be built having the same rotational orientation about the x and y axes, a single slicing operation on a single instance of the Object Group class can be used to determine the sections for all objects that are occurrences of that instance. The sections may be determined when the user selects, for the first time, an object of the group of objects represented by a particular instance of the Object Group class. Accordingly, the processing time required for determining sections of objects that can be grouped together under a single instance of the Object Group class may be much faster than individually determining sections for these objects.

The Clone Group class 304 identifies each instance 318.1.1, 318.1.2, 318.2.1, 319.1.1 of an object having a unique rotational orientation about the x, y and z axes. Accordingly, for each instance of the Object Group 303, there may be one or more instances 318.1.1, 318.1.2, 318.2.1, 319.1.1 of the Clone Group class 304. So, in FIG. 3, objects 218a to 218d may be a single instance 318.1 of the Object group class 303 but objects 218a to 218c are a separate instance 318.1.1, 318.1.2 of the Clone Group class 304 to object 218d. This is also illustrated in FIG. 9, with objects 318.1.2.1 to 318.1.2.3 being a separate instance 318.1.2 of the Clone Group class 304 to object 318.1.1.1.

The Clone Sub-Group class 305 identifies each instance 318.1.1.1, 318.1.2.1, 318.1.2.2, 318.1.2.3, 318.2.1.1 of an object having a unique rotational orientation about the x, y and z axes and a unique translation as a vector from an origin. The Clone Sub-Group 305 class is the terminal class in the hierarchical structure describing the objects and each instance 318.1.1.1, 318.1.2.1, 318.1.2.2, 318.1.2.3, 318.2.1.1 of the Clone Sub-Group class 305 represents a unique object in the build. In this embodiment, for each instance 318.1.1.1, 318.1.2.1, 318.1.2.2, 318.1.2.3, 318.2.1.1 of the Clone Sub-Group 305, scan paths are determined in a scan path operation and stored as an instance of a Master Scan path class 305a. This may be applicable to situations in which the scan path is dependent upon the location of an object in the build volume. However, it is envisaged that in other embodiments, the scan path will not be dependent on the location of an object in the build volume and therefore, scan paths may be determined for each instance of a non-terminal class, such as the Object Group or Clone Group class, the Master Scan Path 305a determined for an instance of the non-terminal class applying to all objects that are represented by this instance of the non-terminal class. The user may be able to select different scan path operations, the application program arranged to determine a Master Scan Path from the instances of the class that is appropriate for the selected scan path operation.

For example, if the scan path strategy selected by the user scans each section of each object in a particular direction based upon the gas flow direction 118, the scan paths may be determined for each instance 318.1.1, 318.1.2, 318.2.1, 319.1.1 of the Clone Group class 304. If the order in which objects are scanned is important, for example with the objects downstream in the gas flow direction 118 being scanned before objects that are upstream in the gas flow direction 118, the scan paths may be determined for each instance 318.1.1.1, 318.1.2.1, 318.1.2.2, 318.1.2.3, 318.2.1.1 of the Clone Sub-Group class 305. If the scanning direction is not specified by a user then the scan path may be determined for each instance of the Object Group class.

It will be understood that other scan strategies may affect from which class the scan paths are determined. For example, the location of the objects may be important when ordering the scanning of objects in a multi-laser system (not shown).

Figure 11:
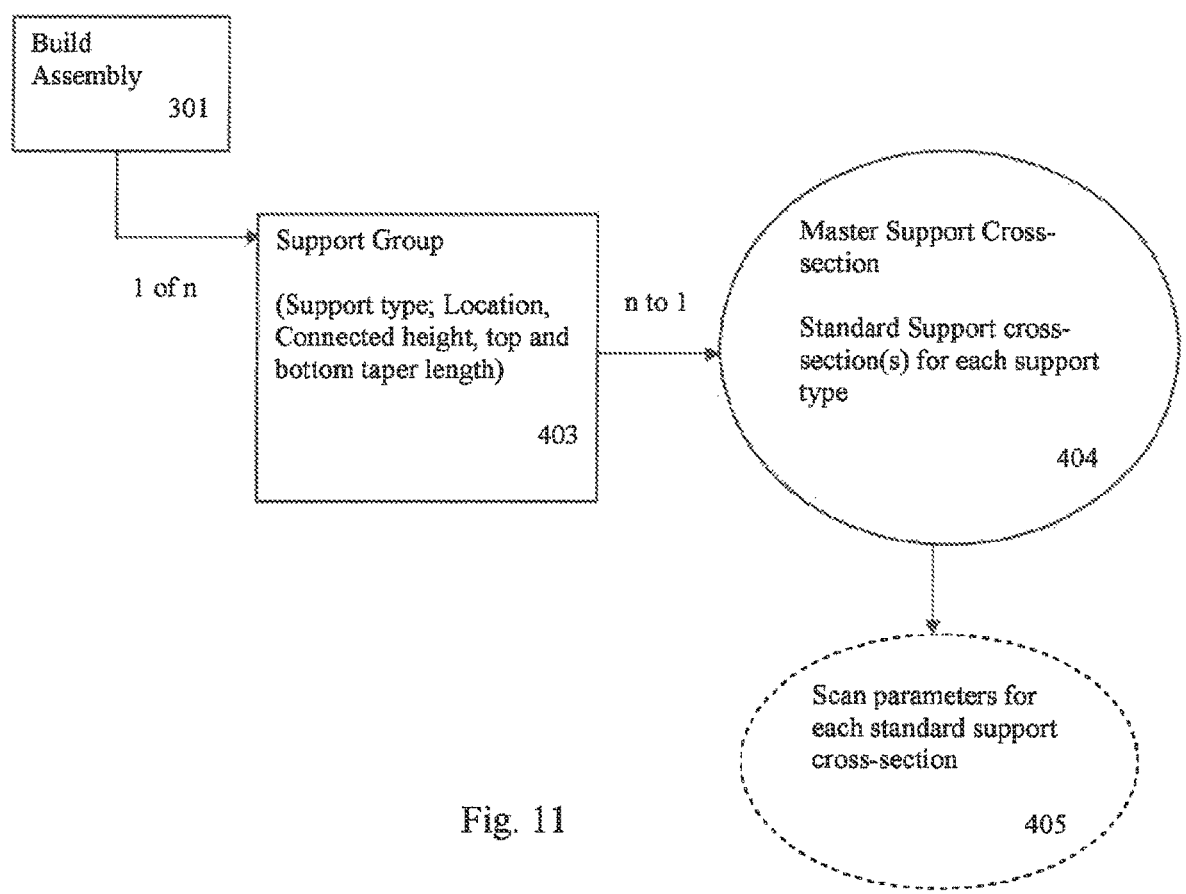
FIG. 11 is a flowchart illustrating the data structure used for defining supports.
Figure 12:
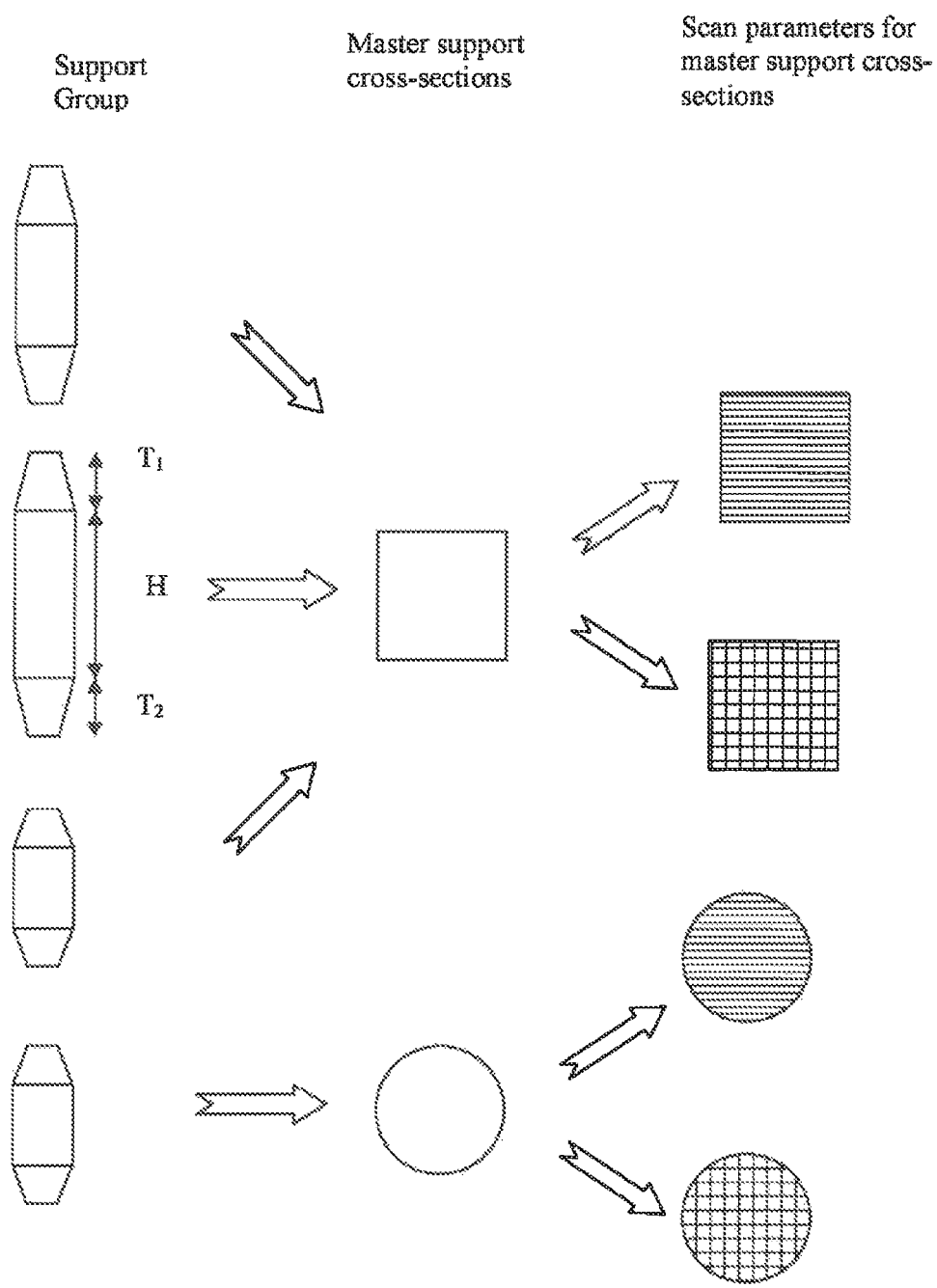
FIG. 12 is a pictorial representation of the data structure used for defining the supports.
Figure 13A:
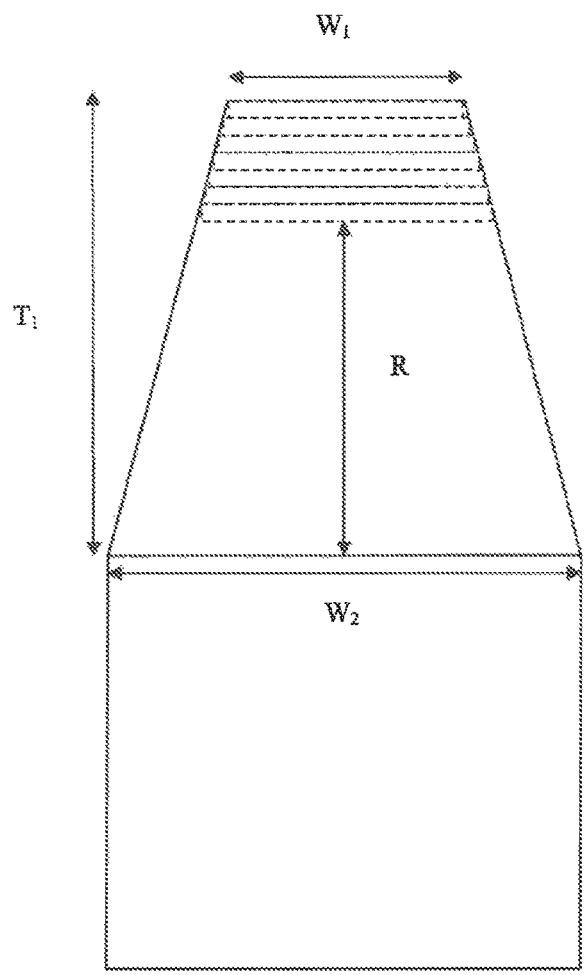
FIGS. 13a and 13b are pictorial representations of the determination of cross-sections and scan paths for tapering regions of a support.
Figure 13B:
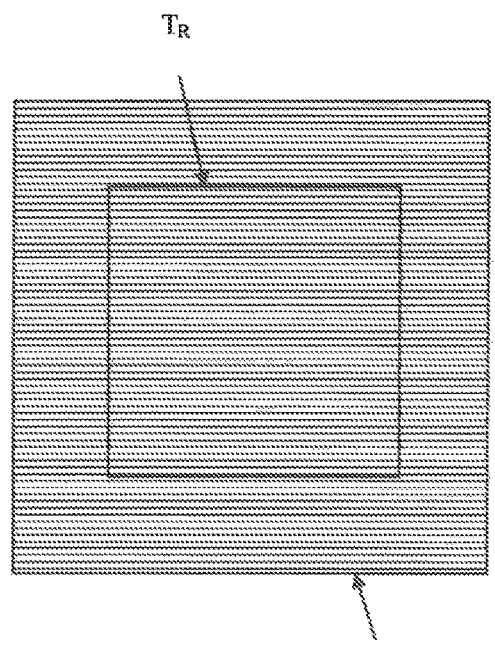

A data structure for supports having a uniform cross-section along a majority of its length is illustrated in FIGS. 11 and 12. Such supports are not described by a three dimensional model (a model representing surfaces of the supports) but through reference to a 2-dimensional representation of the uniform cross-section (so called "standard cross-section"), a support height and a taper length for top and bottom portions of the support. In this way, the addition and/or manipulation of the supports in software by the user does not require the creation and/or alteration of complex three dimensional models. Typically, a build will comprise a large number of supports and reducing the complexity of the coding of the supports can result in dramatic increases in processing speeds.

Each instance of the build assembly class 301 further comprises a support class 403 which defines attributes of each support, in this embodiment, height, h and taper lengths $T_1$ and $T_2$ for the top and bottom of the supports, and identifies a cross-section type for the support through reference to an instance of a Master Cross-Section class 404. Each instance of the Master Cross-Section class defines a different support cross-section. The Master Cross-Section class may also describe scan paths for the laser beam to take when solidifying material to form the cross-section (illustrated by 405). In this way, an amount of data required to define the supports is significantly reduced (particularly because many of the supports will share a common cross-section). Furthermore, the addition of supports during different stages of the design process is simplified as it amounts to the creation of one or more further instances in the Support Class; there is no need to describe the support as a three-dimensional model which is then sectioned and, for each section, scan paths determined. Such determinations may already have been carried out, the results of which are stored as standard cross-sections and scan paths in the Master Cross-Section class.

In this embodiment, the Master Cross-Section class is pre-populated with standard cross-sections, such as square and circular cross-sections, for the supports. The system may be arranged such that the user can add further cross-section types for the supports.

As shown in FIG. 12, the taper lengths $T_1$ and $T_2$ describe lengths over which the supports taper at the top and bottom to provide frangible regions to separate the supports from the object and build platform 102. The cross-sections for these regions of the support are determined by scaling the standard cross-section described in the relevant instance of the Master Cross-Section class based upon the location of the section in the region and the taper length. At a point that a support meets the object and build platform, a set width, $W_1$, of the support is defined. This may be defined by the user. For example, the user may set a diameter of a circle, the width, $W_1$, being the largest scaling of the cross-section (polygon) that fits within the circle having that diameter. Furthermore, a width $W_2$, of the support is known from the relevant instance of the Master Cross-Section class. Accordingly, a scale factor to be applied to the standard cross-section to obtain a cross-section, $T_R$, a distance R from a start point of the tapering region T of the support can be determined from these values. Scan paths for the tapered region are determined by cutting-off the scan paths determined for a standard cross-section at borders, $T_R$, defined by the scaled standard cross-section (see FIG. 13). Scan paths are determined at a number of set locations, R, based upon the thickness of the layers to be formed.

The application program may output 306 one or more build assemblies, each build assembly to be built in a separate additive manufacturing process, the additive manufacturing machine building each build assembly, for example, sequentially or in an order selected by the user. It will be understood that modifications and alterations can be made to the above described embodiment without departing from the scope of the invention as defined in the claims.

What is claimed is:

1. Apparatus for generating geometric data for use in an additive manufacturing process, the apparatus comprising a processing unit arranged to receive data defining surface geometry of objects to be built together in an additive manufacturing process, define each of the objects using a hierarchy of data structures, each data structure of the hierarchy defining at least one further attribute type of the objects and attributes of each object defined by a corresponding instance of each data structure of the hierarchy, the instance of each non-terminal data structure capable of defining at least one attribute common to a plurality of objects, and carry out a slicing operation for determining sections of at least one of the objects, wherein the slicing operation is carried out on an object definition provided by the corresponding instance of one of the non-terminal data structures of the hierarchy.

2. Apparatus according to claim 1, wherein the corresponding instance of the one of the non-terminal data structures of the hierarchy defines an orientation of the object about axes perpendicular to a build direction in which layers of material are successively added during the additive manufacturing process.

3. Apparatus according to claim 2, wherein a data structure lower in the hierarchy than the one of the non-terminal data structures on which the slicing operation is carried out defines an orientation of the object about an axis parallel to the build direction.

4. Apparatus according to claim 1, wherein the data structures are classes in a hierarchical class-based data structure.

5. Apparatus for generating geometric data for use in an additive manufacturing process, the apparatus comprising a processing unit arranged to receive data defining surface geometry of objects to be built together in an additive manufacturing process, define each of the objects using a hierarchy of data structures, each data structure of the hierarchy defining at least one further attribute type of the objects and attributes of each object defined by a corresponding instance of each data structure of the hierarchy, the instance of each non-terminal data structure capable of defining at least one attribute common to a plurality of objects, carry out a slicing operation for determining sections of at least one of the objects to be built in the additive manufacturing process and, for each section, carry out a scan parameter operation to determine scan parameters for a laser or electron beam to use when solidifying areas of a powder layer to form the section, wherein the scan parameter operation is carried out on an object definition provided by the corresponding instance of one of the non-terminal data structures of the hierarchy.

6. Apparatus according to claim 5, wherein the corresponding instance of the one of the non-terminal data structures of the hierarchy defines an orientation of the object about axes perpendicular to a build direction in which layers of material are successively added during the additive manufacturing process.

7. Apparatus according to claim 5, wherein the corresponding instance of the one of the non-terminal data structures of the hierarchy defines an orientation of the object about axis parallel to the build direction.

8. Apparatus according to claim 5, wherein the scan parameter operation determines a scan path of the laser or electron beam to take in solidifying material to form the section of the object.

9. Apparatus according to claim 5, wherein the data structures are classes in a hierarchical class-based data structure.

10. A method for generating geometric data for use in an additive manufacturing process, the method comprising receiving data defining surface geometry of objects to be built together in an additive manufacturing process, defining the objects by creating instances of data structures of a hierarchy of data structures, each data structure defining at least one further attribute type of the objects and attributes of each object defined by a corresponding instance of each data structure of the hierarchy, at least one instance of a non-terminal data structure defining at least one attribute common to a plurality of the objects, and carrying out a slicing operation for determining sections of at least one of the objects, wherein the slicing operation is carried out on an object definition provided by the at least one instance of the non-terminal data structure of the hierarchy defining at least one attribute of the plurality of the objects.

11. A method according to claim 10, wherein the at least one instance of the non-terminal data structure of the hierarchy defines an orientation of the object about axes perpendicular to a build direction in which layers of material are successively added during the additive manufacturing process.

12. A method according to claim 11, wherein a data structure lower in the hierarchy than the non-terminal data structure on which the slicing operation is carried out defines an orientation of the object about an axis parallel to the build direction.

13. A method according to claim 10, wherein the data structures are classes in a hierarchical class-based data structure.

14. A non-transient data carrier having instructions thereon, the instructions, when executed by a processor, cause the processor to carry out the method of claim 10.

15. A method for generating geometric data for use in an additive manufacturing process, the method comprising receiving data defining surface geometry of objects to be built together in an additive manufacturing process, defining the objects by creating instances of data structures of a hierarchy of data structures, each data structure defining at least one further attribute type of the objects and attributes of each object defined by a corresponding instance of each data structure of the hierarchy, at least one instance of a non-terminal data structure defining at least one attribute common to a plurality of the objects, carrying out a slicing operation for determining sections of a plurality of the objects to be built in the additive manufacturing process and, for each section, carrying out a scan parameter operation to determine scan parameters for a laser or electron beam to take in solidifying areas of a powder layer to form the section, wherein the scan parameter operation is carried out on an object definition provided by the at least one instance of a non-terminal data structure of the hierarchy defining at least one attribute of the plurality of the objects.

16. A method according to claim 15, wherein the at least one instance of the non-terminal data structure of the hierarchy defines an orientation of the object about axes perpendicular to a build direction in which layers of material are successively added during the additive manufacturing process.

17. A method according to claim 15, wherein the scan parameter operation comprises determining a scan path of the laser or electron beam to take in solidifying material to form the section of the object.

18. A method according to claim 15, wherein the data structures are classes in a hierarchical class-based data structure.

19. A non-transient data carrier having instructions thereon, the instructions, when executed by a processor, cause the processor to carry out the method of claim 15.

20. A method according to claim 15, wherein the instance of the at least one non-terminal data structure of the hierarchy defines an orientation of the object about axis parallel to the build direction.

* * * * *